(12) United States Patent
Iwamura

(10) Patent No.: US 6,425,081 B1
(45) Date of Patent: Jul. 23, 2002

(54) ELECTRONIC WATERMARK SYSTEM ELECTRONIC INFORMATION DISTRIBUTION SYSTEM AND IMAGE FILING APPARATUS

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/134,516

(22) Filed: Aug. 14, 1998

(30) Foreign Application Priority Data

| Aug. 20, 1997 | (JP) | 9-223929 |
| Aug. 20, 1997 | (JP) | 9-223930 |
| Aug. 20, 1997 | (JP) | 9-223931 |
| Aug. 20, 1997 | (JP) | 9-223932 |

(51) Int. Cl.[7] .............................. H04L 9/00; G06F 17/60
(52) U.S. Cl. ............................................ 713/176; 705/58
(58) Field of Search ............................. 713/176; 705/58

(56) References Cited

U.S. PATENT DOCUMENTS 5,509,074 A * 4/1996 Choudhury et al. ........ 713/176
5,600,720 A    2/1997 Iwamura et al.
5,666,419 A    9/1997 Yamamoto et al.
5,673,316 A * 9/1997 Auerbach et al. ............. 705/51
6,002,772 A * 12/1999 Saito ........................... 705/58
6,154,841 A * 11/2000 Oishi .......................... 713/180

OTHER PUBLICATIONS

Schneier, Bruce, Applied Cryptography, 1996, John Wiley & Sons, Inc., 2nd ed., pp. 455–458., 516–517.*
"Asymmetric Fingerprinting", B. Pfitzmann, et al., Advances in Technology—EUROCRYPT '96, International Conference on the Theory and and Application of Cryptographic Techniques, Saragossa, Spain, May 12–16, Proceedings, Ueli Maurer (Ed.), pp. 84–95.

* cited by examiner

Primary Examiner—Gilberto Barron
Assistant Examiner—Douglas J. Meislahn
(74) Attorney, Agent, or Firm—Fitzpatrick, Cella, Harper & Scinto

(57) ABSTRACT

Disclosed is an electronic watermark method, used for a network, comprising a plurality of entities, wherein provided weparately are an entity for embedding an electronic watermark in encrypted data that are exchanged by said plurality of entities, and an entity for performing an encryption process and a corresponding decryption process.

9 Claims, 18 Drawing Sheets

FIG. 6

| IMAGE HEADER PORTION | IMAGE FORMAT IDENTIFIER |
| --- | --- |
| | FILE SIZE |
| | NUMBER OF PIXELS IN X-DIRECTION (WIDTH) |
| | NUMBER OF PIXELS IN Y-DIRECTION (HEIGHT) |
| | SIZE IN DEPTH-DIRECTION |
| | COMPRESSED OR NOT |
| | RESOLUTION |
| | OFFSET TO BIT MAP |
| | COLOR PALETTE SIZE |
| | |
| IMAGE DATA PORTION | BIT MAP |

FIG. 9

| PROPERTY NAME | ID CODE | TYPE |
|---|---|---|
| NUMBER OF HIERARCHICAL LAYERS OF IMAGE DATA | 0×01000000 | VT_UI4 |
| WIDTH OF IMAGE OF MAX. RESOLUTION | 0×01000002 | VT_UI4 |
| HEIGHT OF IMAGE OF MAX. RESOLUTION | 0×01000003 | VT_UI4 |
| HEIGHT OF INITIAL DISPLAY | 0×01000004 | VT_R4 |
| WIDTH OF INITIAL DISPLAY | 0×01000005 | VT_R4 |

| PROPERTY NAME | ID CODE | TYPE |
|---|---|---|
| WIDTH OF IMAGE OF EACH RESOLUTION | 0×02ii0000 | VT_UI4 |
| HEIGHT OF IMAGE OF EACH RESOLUTION | 0×02ii0001 | VT_UI4 |
| COLOR OF IMAGE OF EACH RESOLUTION | 0×02ii0002 | VT_BLOB |
| FORMAT REPRESENTING IMAGE OF EACH RESOLUTION BY NUMERICAL VALUES | 0×02ii0003 | VT_UI4 \| VT_VECTOR |

| PROPERTY NAME | ID CODE | TYPE |
|---|---|---|
| JPEG TABLE | 0×03ii0001 | VT_BLOB |
| INDEX OF MAX. JPEG TABLE | 0×03000002 | VT_UI4 |

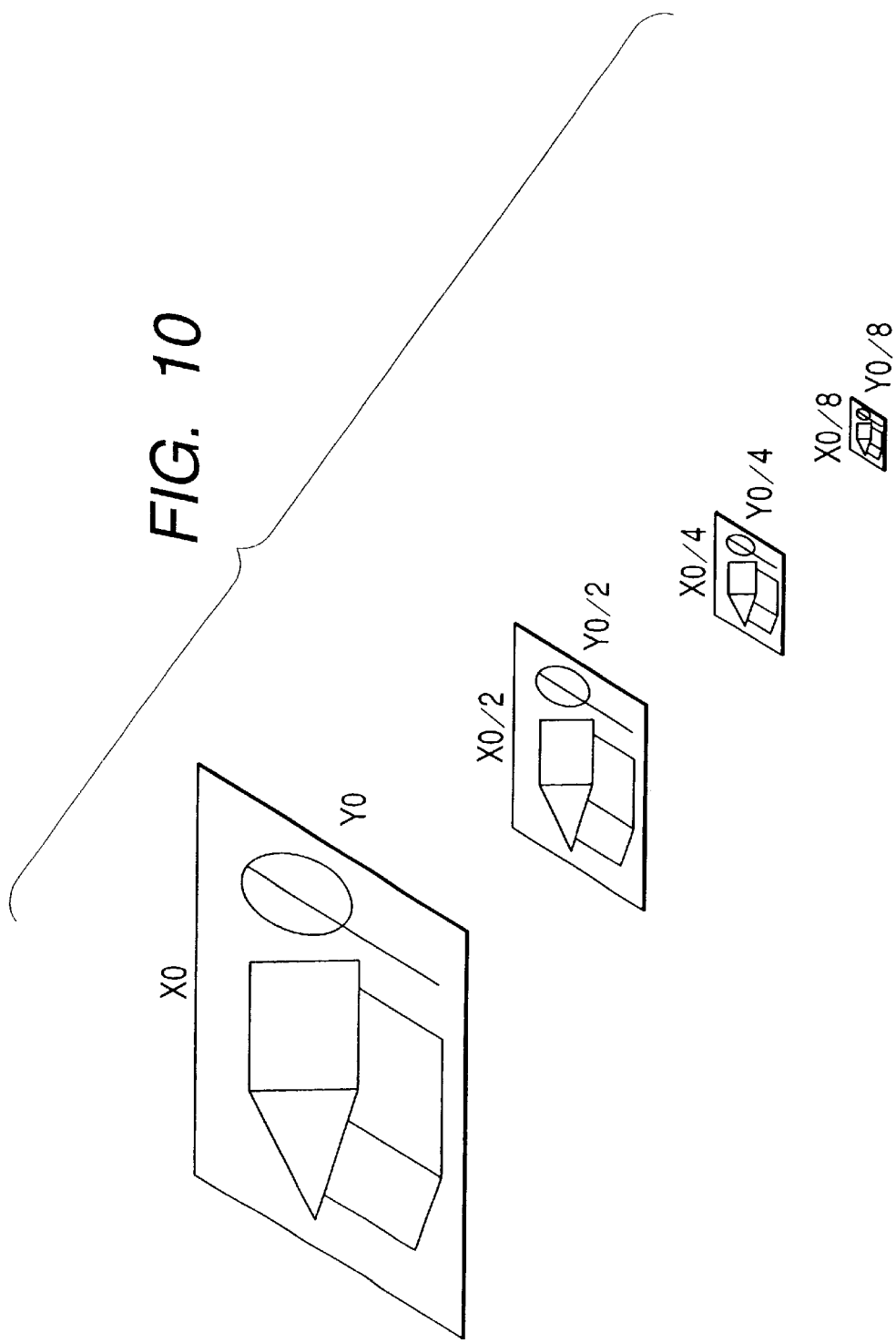

| FIELD NAME | LENGTH | BYTES |
|---|---|---|
| WIDTH OF IMAGE | 4 | 4—7 |
| HIGHT OF IMAGE | 4 | 8—11 |
| TOTAL NUMBER OF TILES | 4 | 12—15 |
| WIDTH OF TILE | 4 | 16—19 |
| HIGHT OF TILE | 4 | 20—23 |

ELECTRONIC WATERMARK SYSTEM ELECTRONIC INFORMATION DISTRIBUTION SYSTEM AND IMAGE FILING APPARATUS

BACKGROUND OF THE INVENTION

1. Field of the Invention

The present invention relates to an electronic watermark system, an electronic information distribution system and an image filing apparatus, and in particular to an electronic watermark technique for protecting a copyright for digital information, such as moving picture data, static picture data, audio data, computer data and computer programs, to a multimedia network for employing such an electronic watermark technique for the distribution of digital information, and to an image filing apparatus that employs such a multimedia network.

2. Related Background Art

As a consequence of recent developments concerning computer networks and the availability of inexpensive high-performance computers, electronic transactions for trading products across a network have become popular. Products for such transaction can be digital data, including pictures, for example.

However, since a large number of complete copies of digital data can be easily prepared, a user who purchases digital data would be able to illegally prepare copies having the same quality as the original, and could then distribute the copied data. As a result, a warrantable price would not be paid to the owner of the copyright for the digital data or to a person (hereinafter referred to as a "seller") by whom sale of the digital data is authorized by the copyright owner, and the infringement of the copyright would occur.

Once a copyright holder or a seller (hereinafter a person who legally distributes digital data is generally called a "server") has transmitted digital data to a user, full protection against the illegal copying of data is not possible.

Therefore, an electronic watermark technique has been proposed for use instead of a method for the direct prevention of illegal copying. According to the electronic watermark technique, a specific process is performed for the original digital data and copyright information concerning the digital data, or user information, is embedded in the digital data, so that when an illegal copy of the digital data is discovered, the person who distributed the copied data can be identified.

In a conventional electronic watermark system, a server is assumed to be fully trustworthy. Therefore, if a server in a conventional system proves not to be trustworthy, and may engage in some sort of illegal activities, a user who has committed no crime may be accused of illegally copying data.

This occurs because in a conventional electronic watermark system, as is shown in FIG. 1, when a server embeds user information d1 for identifying a user (user U in FIG. 1) in digital data g (in the following explanation image data are employed as the digital data) distributed to the user, and thereafter, without the permission of the user makes a further distribution of the data containing the user's identification data and then accuses the user of making illegal copies, there is no way the user can refute the accusation of the server, even though in this instance it is the server that is at fault.

As a countermeasure, a system (FIG. 2) using a public key encryption method has been proposed, for example, in "Asymmetric Finger Printing", B. Pfitmmann and M. Waidner, EUROCRYPT '96 (hereinafter referred to as reference 1). According to the public key encryption method, an encryption key and a decryption key differ, and the encryption key is used as a public key while the decryption key is used as a secret key. The RSA encryption and the ElGamal encryption are well known as typical examples for the public key encryption.

An explanation will be given for (a) features of the public key encryption system and (b) protocols for secret communication and authenticated communication.

(a) Features of public key encryption (1) Since an encryption key and a decryption key differ, and the encryption key can be published, a secret delivery process is not required for the encryption key and it can be delivered easily.

(2) Since the encryption keys of users are published, users need only provide for the secret storage of their decryption keys.

(3) An authentication function can be provided with which a recipient can verify that the sender of a message is not perpetrating a fraud and that the received message has not been altered.

(b) Protocols for public key encryption

For example, when E (kp, M) denotes an encryption operation for a message M that uses a public encryption key kp, and D (ks, M) denotes a decryption operation for a message Ms that uses a secret decryption key ks, the public key encryption algorithm satisfies the two following conditions.

(1) The calculations for the encryption E (kp, M) can be performed easily using the encryption key kp that is provided, and the calculations for the decryption D (ks, M) can also be performed easily using the decryption key ks that is provided.

(2) So long as a user does not know the decryption key ks, even if the user knows the encryption key kp and the calculation procedures for the encryption E (kp, M), and that the encrypted message C=E (kp, M), the user can not ascertain the contents of the message M because a large number of calculations are required.

When, in addition to the conditions (1) and (2), the following condition (3) is established, the secret communication function can be implemented.

(3) The encryption E (kp, M) can be defined for all the messages (plain text) M, and $$D(ks, E(kp, M)) = M$$

is established. That is, anyone can perform the calculations for the encryption E (kp, M) using the public encryption key kp, but only a user who has the secret decryption key ks can perform the calculations for the decryption D (ks, E (kp, M)) to obtain the message M.

When, in addition to the above conditions (1) and (2), the following condition (4) is established the authenticated communication function can be implemented.

(4) The decryption D (ks, M) can be defined for all the messages (plain text) M, and $$E(kp, D(ks, M)) = M$$

is established. That is, only a user who has the secret decryption key ks can calculate the decryption D (ks, M). Even if another user calculates D (ks', M) using a bogus secret decryption key ks' and performs the calculations as would a user who has the secret decryption key ks, the result obtained is $$E(kp, D(ks', M)) \neq M,$$

and a recipient can understand that the received information was illegally prepared.

When the value D (ks, M) is altered, the result is $$E(kp, D(ks,M)') \neq M,$$

and a recipient can understand that the received information was illegally prepared.

In the above described encryption method, the operation E ( ), using the public encryption key (hereinafter also referred to as a public key) kp, is called "encryption", and the operation D ( ), using the secret decryption key (hereinafter also referred to as a secret key) ks, is called "decryption".

Therefore, for a secret communication a sender performs the encryption and a recipient performs the decryption, while for an authenticated communication, a sender performs the decryption and a recipient performs the encryption.

The protocols are shown for a secret communication, an authenticated communication, and a secret communication with a signature performed by a sender A for a recipient B using the public key encryption system.

The secret key of the sender A is ksA and the public key is kpA, and the secret key of the recipient B is ksB and the public key is kpB.

Secret Communication

The following procedures are performed for the secret transmission of a message (plain text) M from the sender A to the recipient B.

Step 1: The sender A transmits to the recipient B a message C that is obtained by employing the public key kpB of the recipient B to encrypt the message M as follows:

$$C=E(kpB,M).$$

Step 2: To obtain the original plain language message M, the recipient B employs his or her secret key ksB to decrypt the received message C as follows:

$$M=D(ksB,C).$$

Since the public key kpB of the recipient B is openly available to an unspecified number of people, users other than the sender A can also transmit secret communications to the recipient B.

Authenticated Communication

For the authenticated transmission of a message (plain text) M from the sender A to the recipient B, the following procedures are performed.

Step 1: The sender A transmits to the recipient B a message S that he or she created by employing his or her secret key as follows:

$$S=D(ksA,M).$$

This message S is called a signed message, and the operation for acquiring the signed message S is called "signing".

Step 2: To convert the signed message S and obtain the original plain language message M, the recipient B employs the public key KpA of the sender A as follows:

$$M=E(kpA,S).$$

If the recipient B ascertains that the message M makes sense, he or she issues verification that the message M has been transmitted by the sender A. And since the public key kpA of the sender A is available to an unspecified number of persons, users other than the recipient B can also authenticate the signed message S from the sender A. This authentication is called "digital signing".

Secret Communication with Signature

The following procedures are performed for the secret transmission to the recipient B by the sender A of a message (plain text) M for which a signature is provided.

Step 1: The sender A prepares a signed message S by employing his or her secret key ksA to sign the message M as follows:

$$S=D(ksA,M).$$

Furthermore, to obtain an encrypted message C that is thereafter transmitted to the recipient B, the sender A employs the public key kpB of the recipient B to encrypt the signed message S as follows:

$$C=E(kpB,S).$$

Step 2: To obtain the signed message S the recipient B employs his or her secret key ksB to decrypt the encrypted message C as follows:

$$S=D(ksB,C).$$

In addition, to obtain the original plain text message M, the recipient B employs the public key kpA of the sender A to convert the signed message S as follows:

$$M=E(kpA, S).$$

When the recipient has ascertained that the message M makes sense, he or she verifies that the message M was transmitted by the sender A.

For a secret communication for which a signature has been provided, the order in which the calculating functions are performed at the individual steps may be inverted. In other words, in the above procedures, Step 1: C=E (kpB, D (ksA, M))
Step 2: M=E (kpA, D (ksB, C)) are calculated in this order. However, for calculations performed for such a secret communication, the following order may be employed:
Step 1: C=D (ksA, E (kpB, M))
Step 2: M=D (ksB, E (kpA, C)).

An explanation will now be given for the operating procedures for a conventional electronic watermark system employing the above described public key encryption method.

1) First, a contract d2 concerning the trading of image data g is prepared by a server and a user.

2) Next, the user generates a random number ID to identify himself or herself, and employs this ID to generate a one-way function f. The one-way function is a function such that for a function y=f(x), calculating y from x is easy but calculating x from y is difficult. For example, a unique factorization or a discrete logarithm for an integer having a number of digits is frequently employed as a one-way function.

3) Then, the user prepares the signature information d3 using his or her secret key ksU, and transmits it with the contract d2 and the one-way function f to the server.

4) Following this, the server verifies the signature information d3 and the contract d2 using the public key kpU of the user.

5) After the verification has been completed, the server embeds in the image data g a current data distribution record d4 and a random number ID prepared by the user, and generates image data which includes an electronic watermark (g+d4+ID).

6) Finally, the server transmits to the user the image data that includes the electronic watermark (g+d4+ID).

When an illegal copy of data is found, embedded information is extracted from the illegal image data, and a specific user is identified using the ID included therein. At this time, a claim by the server that it did not distribute the illegal copy without permission is based on the following grounds.

Since the ID specifically identifying a user is generated by the user, and since by using that ID the signature of the user is provided for the one-way function f, the server can not generate such an ID for an arbitrary user.

However, since a user who has officially concluded a contract with the server must transmit his or her ID to the server, only users who have not made contracts with the server can not be accused of committing a crime, whereas a user who has officially concluded a contract can be so accused.

A system (FIG. 3) for neutralizing an accusation that a crime has been committed by a user who has officially concluded a contract is proposed in "Electronic watermarking while taking server's illegal activity into account", Miura, Watanabe and Kasa (Nara Sentan University), SCIS97-31C (hereinafter referred to as reference 2). This system is implemented by dividing the server into an original image server and an embedding server. According to this system, the embedded electronic watermark is not destroyed during encryption and decryption.

The operating procedures for the system in FIG. 3 will now be described.

1) First, to obtain desired image data a user issues a request bearing his or her signature d5 to an original image server.

2) The original image server employs the user's signature d5 to verify the contents of the request, and subsequently encrypts the requested image data g and transmits the encrypted data to an embedding server.

At this time, the original image server transmits to the embedding server a user name u accompanied by a signature for consignment contents d6. At the same time, the original image server also transmits to the user a decryption function f' that is related to the encryption.

3) The embedding server verifies the received encrypted image data g' and the signature (u+d6), employs the user name u and the consignment contents d6 to prepare and embed user information d7 for specifically identifying a user, and thereby creates encrypted data having an included electronic watermark (g'+d7). Then, the embedding server transmits to the user the encrypted image data (g'+d7) that includes the electronic watermark.

4) The user employs the decryption function f', which was received from the original image server, to decrypt the encrypted image data that includes an electronic watermark, (g'+d7), and to obtain the image data provided with the electronic watermark, (g+d7).

When an illegal copy is found later, the original image server encrypts the illegal image data, and extracts the embedded information and transmits it to the embedding server. The embedding server specifically identifies a user from the embedded information.

This system is based on the premise that, since the original image server does not embed in the image data g the user information d7 specifically identifying a user, and since the embedding server does not know the decryption function f (can not retrieve the original image), the individual servers can not illegally distribute to officially contracted servers image data in which is embedded the user information d7.

However, neither the collusion of the original image server with the embedding server, nor the collusion of the embedding server with a user is taken into account in the system in FIG. 3. Since the embedding server holds the encrypted image data g' for the image data g, which are the original image data, and the user holds the decryption function f', when the original image server is in collusion with the embedding server, the servers, as in the system in FIG. 2, can perform an illegal activity. And when the embedding server is in collusion with the user, the original image can be illegally obtained.

The original image server transmits the decryption function f' to the user; however, if the user does not provide adequate management control for the decryption function f', the carelessness of the user will result in the embedding server obtaining knowledge of the decryption function f', even though the embedding server is not in collusion with the user.

Furthermore, in the system in FIG. 3 the original image sever does not include embedding information, nor can it correctly perform embedding. However, since the embedded information is extracted by the original image server, the original image server could correctly perform the embedding by analyzing the embedded information.

Since the embedding server does not embed its own signature, the embedded information and the corresponding user information are the only embedding server secrets. However, the correspondence engaged in by the embedded information, and the user information is not random correspondence involving the use of a database, and if the embedded information is prepared from the user information according to specific rules, there is a good probability that analyzation of the embedded information will be possible.

In this case, as in the system in FIG. 2, the performance of an illegal activity is possible.

Further, for the above described secret communication for which a signature is provided, a blind decryption method having the following features is employed for the aforementioned decryption.

In the following explanation, digital data, such as image data, are encrypted by A (assumed to be a server) using the public key encryption method, and the encrypted data G is obtained by B (assumed to be a user).

A person who legally distributes digital data, such as image data, is called a server.

Features of Blind Decryption

1) The contents of the data G are kept secret from third parties, persons other than the server and the user.

2) The user obtains the data G, while disabling the ability of the server to forge or alter the data G in the protocol.

3) The user decrypts the encrypted data G without notifying the server, and thus protects the privacy of the transaction.

Blind decryption is used in order that, when a large amount of data encrypted by a server are stored on a CD-ROM, etc., and are delivered to a user, the user can obtain desired data without the server being aware of which data included on the CD-ROM have been decrypted. As a result, the privacy of the user, such as information concerning which data the user purchased, can be protected.

The following blind decryption procedures are performed when the user pays the server a price for data that are purchased. The trading of data, such as software programs, can be implemented across a network or electronically, so as to initiate electronic commerce.

A description of the blind procedures follows.

The encryption systems of the server and of the user are denoted respectively by E1 ( ) and E2 ( ), and the decryption systems of the server and the user are denoted respectively by D1 ( ) and D2 ( ). Assume forthwith that for blind decryption the following equation is established by the encryption systems of the server and the user:

$$E1(E2(G))=E2(E1\ (G)).$$

Blind Decryption Procedures

1) The user employs the encryption key (public key) of the server to encrypt data G, and obtains the encrypted message Cs.

The encrypted message Cs is represented by $$Cs=E1(G).$$

2) The user encrypts the message Cs obtained at 1) using the user's encryption key (public key), and transmits the encrypted message Csu to the server.

The encrypted message Csu is represented by $$Csu=E2(Cs).$$

3) The server employs the server's decryption key (secret key) to decrypt the message Csu received from the user, and transmits the decrypted message Cu to the user.

The decrypted message Cu is represented by $$Cu=D1(Csu)=D1(E2(E1(G)))=E2(G).$$

4) The user employs the user's decryption key (secret key) to decrypt the message Cu received from the server, and obtains data G.

The data G is represented by $$G=D2(E2(G)).$$

When the RSA encryption system is employed for blind decryption, generally, assuming that respectively the public keys of the server and the user are e1 and e2 and their secret keys are d1 and d2, blind decryption is performed as follows.

The mod operation is not shown.

Processing for Blind Decryption Using the RSA Encryption System

1) The user encrypts the data G using the public key e1 of the server, and obtains the encrypted message Cs.

The message Cs is represented by $$Cs=G^{e1}.$$

2) The user employs the user's public key e2 to encrypt the message Cs ($=G^{e1}$) obtained at 1), and transmits the encrypted message Csu to the server.

The message Csu is represented by $$Csu=(G^{e1})^{e2}.$$

3) The server employs the server's public key e1 to decrypt the encrypted message Csu ($=(G^{e1})^{e2}$) received from the user, and transits the decrypted message Cu to the user.

The decrypted message Cu is represented by $$Cu=G^{e2}.$$

4) The user employs the user's public key e2 to decrypt the message Cu ($=G^{e2}$) received from the server, and obtains the original data G (the final data for the user).

Even when the above public key encryption system is employed, however, the user who purchased digital data, such as image data, could obtain a benefit by making a copy of the data and illegally distributing the copy.

Therefore, a method exists that is called "electronic watermarking". According to the "electronic watermarking" method, a specific operation is performed for original digital data, such as image data, to embed in the digital data copyright information concerning the digital data, and user information (an electronic watermark embedding process), so that when an illegal copy is found, the person who distributed the copy can be specifically identified.

The employment of both the electronic watermarking technique and the public key encryption system can protect the privacy of a user, and can also prevent the illegal distribution of data by a user.

The conventional blind decryption technique, which is a system for decrypting data that are encrypted using the above described public key encryption system, is effective as protocol for transmitting original digital data (the data G) from a server to a user, with the privacy of the user being protected. However, the conventional blind decryption technique is not appropriate as a protocol for implementing the following features.

1) The contents of the data G are kept secret from third parties, persons other than the server and the user.

2) The server performs a modification, such as an electronic watermarking process, in accordance with the protocol, and does not transmit the data G to the user unchanged.

3) The protocol according to which a partner can not be accused of a crime is employed to prevent the illegal distribution of data by a server and a user.

SUMMARY OF THE INVENTION

To resolve the above problems, it is one objective of the present invention to provide an electronic watermarking method whereby the above described illegal activities and the illegal distribution of the original data by a server and a user can be prevented, and to provide an electronic information distribution system therefor.

To achieve the above objective, according to one aspect of the present invention, an electronic watermarking method comprises a step of at least performing either an encryption process or a decryption process for data in which electronic watermark information is embedded.

According to an another aspect of the present invention, an electronic watermark method comprises a step of embedding specific electronic watermark information in which different electronic watermark information has been embedded and that has already been encrypted.

The data in which different electronic watermark information is to be embedded may be data that are encrypted in which specific electronic watermark information has been embedded.

Different electronic watermark information may be embedded in the data after the data have been encrypted using a different encryption method.

According to an another aspect of the present invention, different information is embedded as electronic watermark information in common data before and after encryption is performed for the common data.

According to an another aspect of the present invention, provided is an electronic watermark method, used for a network, that includes a plurality of entities whereof provided separately are an entity for embedding an electronic watermark in encrypted data that are exchanged by the plurality of entities, and an entity for performing an encryption process and a corresponding decryption process.

With the above arrangement, the encrypted data may be image data.

According to an another aspect of the present invention, an electronic information distribution system, which exchanges digital information across a network system constituted by a plurality of entities, comprises a first entity for embedding electronic information for the digital data, and a second entity for performing an encryption process and a corresponding decryption process for the digital data.

According to an another aspect of the present invention, provided is an electronic information distribution system wherein, for the exchange of digital information between a first entity and a second entity in a network that includes a plurality of entities, the first entity receives encrypted information from the second entity, embeds electronic watermark information in the encrypted information and transmits the resultant information to the second entity, and the second entity performs a corresponding decryption process for the encrypted information received from the first entity.

According to an another aspect of the present invention, provided is an electronic information distribution system wherein, for the exchange of digital information by a first entity and a second entity across a network system constituted by a plurality of entities, the first entity embeds electronic watermark information in information and performs a first encryption process for the information, and transmits the resultant information to the second entity; wherein the second entity performs a second encryption process for the information received from the first entity and transits the resultant information to the first entity; wherein the first entity performs a first decryption process, corresponding to the first encryption process, for the information received from the second entity, and embeds electronic watermark information in the resultant information and transmits the obtained information to the second entity; and wherein the second entity performs a second decryption process, corresponding to the second encryption process, for the information received from the first entity.

The electronic watermark information embedded by the first entity may at the least include either information concerning the second entity or information concerning digital data to be transmitted.

Preferably, the first entity examines a signature of the second entity by using an anonymous public key having a certificate that is issued by an authentication center.

According to an another aspect of the present invention, provided is an image file apparatus, which stores, as image data, image information obtained by decrypting image information for which encryption has been performed, and electronic watermark information that is added to the image information while it is encrypted and that is decrypted using the image information.

Key information concerning the encryption may be stored separately from the image data.

According to an another aspect of the present invention, an entity for performing an encryption process and an electronic watermark embedding process embeds an electronic watermark for information at least either before or after the information is encrypted.

In this aspect of the present invention, the entity is an entity for receiving information.

In this aspect of the present invention, the entity transmits, to an information provision entity, information that is encrypted in which an electronic watermark has been embedded.

In this aspect of the present invention, the entity further transmits, to the information provision entity, a value that is obtained by transforming, using a one-way compression function, the information that is encrypted in which an electronic watermark has been embedded.

In this aspect of the present invention, the entity receives information that primarily is encrypted in advance, and performs a secondary encryption process and an electronic watermark embedding process for the encrypted information.

According to an another aspect of the present invention, an entity for receiving information embeds an electronic watermark in the information.

In this aspect of the present invention, the entity transmits to an information provision entity the information in which the electronic watermark has been embedded.

In this aspect of the present invention, the information provision entity embeds in the information an electronic mark that differs from the electronic watermark.

In this aspect of the present invention, the information is image information.

According to an another aspect of the present invention, a one-way compression function is employed to examine the legality of at the least either an encryption process or an electronic watermark embedding process.

According to an another aspect of the present invention, provided is an electronic watermark method used for a network system that includes a plurality of entities, whereby, for the exchange of digital data by a first entity and a second entity at the least of the plurality of entities, the first entity embeds an electronic watermark in the digital information before or after performing a first encryption process and transmits the resultant digital information to the second entity, and the second entity embeds an electronic watermark in the digital information received from the first entity before or after a second encryption process.

According to an another aspect of the present invention, provided is an electronic watermark method used for a network system that includes a plurality of entities, whereby, for the exchange of digital data by at least a first entity and a second entity of the plurality of entities, before a first encryption the first entity performs an electronic watermark embedding process for the digital information and transmits the resultant digital information to the second entity; whereby, before a second encryption the second entity, without decrypting the digital information, performs an electronic watermark embedding process for the digital information received from the first entity; whereby the first entity performs a decryption process, corresponding to the first encryption, for the digital information received from the second entity and transmits the decrypted digital information to the second entity; and whereby the second entity performs a decryption process, corresponding to the second encryption, for the digital information received from the first entity.

In this aspect of the present invention, before performing the electronic watermark embedding process, the first entity uses an anonymous public key having a certificate that is issued by an authentication center to examine a signature included with the second entity.

In this aspect of the present invention, the electronic watermark embedding process performed by the first entity is a process for embedding information concerning the second entity.

In this aspect of the present invention, the electronic watermark embedding process performed by the first entity is a process for embedding information concerning digital information to be transmitted.

In this aspect of the present invention, the electronic watermark embedding process performed by the second entity is a process for embedding information that only the second entity is capable of creating.

According to an another aspect of the present invention, provided is an electronic information distribution system, which includes a plurality of entities and exchanges information across a network, wherein at least one of the plurality of entities includes encryption means and electronic watermark embedding means, and wherein the electronic watermark embedding means performs an electronic watermark embedding process for information at least before or after the encryption means encrypts the information.

According to an another aspect of the present invention, provided is an electronic information distribution system, which includes a plurality of entities and exchanges information across a network, wherein of the plurality of entities one entity for receiving information includes electronic watermark embedding means for performing an electronic watermark embedding process for received information.

According to an another aspect of the present invention, provided is an electronic information distribution system, which includes a plurality of entities and exchanges information across a network, wherein one of the plurality of entities includes encryption means and electronic watermark embedding means, and another entity includes means for employing a one-way compression function to examine at the least the legality either of an encryption process performed by the encryption means, or of an electronic watermark embedding process performed by the electronic watermark embedding means.

According to an another aspect of the present invention, provided is an electronic information distribution system, which includes a plurality of entities and exchanges information across a network, wherein the plurality of entities includes a first entity having first encryption means and first electronic watermark embedding means, and a second entity having second encryption means and second electronic watermark embedding means; wherein the first electronic watermark embedding means performs at the least an electronic watermark embedding process for digital information before or after the first encryption means encrypts the information; and wherein second electronic watermark embedding means performs at the least an electronic watermark embedding process for the information received from the first entity before or after the second encryption means encrypts the digital information.

According to an another aspect of the present invention, provided is an electronic information distribution system, which includes a plurality of entities and exchanges information across a network, wherein the plurality of entities includes at the least first and second entities for exchanging digital information; wherein the first entity includes first encryption means, first electronic watermark embedding means for performing an electronic watermark embedding process for digital information before encryption is performed by the encryption means, and first decryption means for performing decryption, corresponding to the encryption performed by the first encryption means, of digital information received from the second entity; and wherein a second entity includes second encryption means, second electronic watermark embedding means for, before encryption is performed by the second encryption, performing an electronic watermark embedding process without decrypting the digital information received from the first entity, and second decryption means for performing decryption, corresponding to the encryption performed by the second encryption means, of the digital information received from the first entity.

In this aspect of the present invention, before performing the electronic watermark embedding process, the first entity uses an anonymous public key having a certificate that is issued by an authentication center to examine a signature included with the second entity.

In this aspect of the present invention, the first electronic watermark embedding process is a process for embedding information concerning the second entity.

In this aspect of the present invention, the first electronic watermark embedding means embeds information concerning digital information to be transmitted.

In this aspect of the present invention, the second electronic watermark embedding means embeds information that only the second entity is capable of creating.

According to an another aspect of the present invention, provided is an image file apparatus for storing image information with electronic watermark information and information for examining the legality of the electronic watermark information.

In this aspect of the present invention, information for examining the legality constitutes a one-way compression function.

In this aspect of the present invention, the electronic watermark information is information that is encrypted with the image information, and that is decrypted with the image information.

In this aspect of the present invention, the one-way compression function is used to transform the encrypted image information and the electronic watermark information.

According to an another aspect of the present invention, an electronic watermark system for embedding electronic watermark information comprises:

means, or an entity, for examining the legality of either an encryption process or of an electronic watermark embedding process at the least; and means, or an entity, provided separately from said examining means or unit, for performing the encryption process and the electronic watermark embedding process.

The means for examining the legality may be provided for a third entity, which is provided separately from a first entity that includes means for performing the encryption process and the electronic watermark embedding process for information, and a second entity, for receiving from the first entity encrypted information in which an electronic watermark has been embedded.

The first entity may be provided at an information reception side, and may transmit the encrypted information in which the electronic watermark has been embedded to the second entity at an information provision side.

The first entity may employ a one-way compression function to transform the encrypted information in which an electronic watermark has been embedded, and to output the obtained value together with the encrypted information in which the electronic watermark has been embedded.

The first entity may transmit to the third entity a value obtained by transformation using the one-way compression function.

The third entity may be capable of performing a decryption process corresponding to the encryption process.

The first entity may receive primarily encrypted information in advance, and may perform a secondary encryption process and an electronic watermark embedding process for the primarily encrypted information.

According to an another aspect of the present invention, provided is an electronic watermark system for embedding an electronic watermark, wherein an entity for managing an encryption key includes means for examining the legality of electronic watermark information.

In order to examine the legality of the electronic watermark and the encryption process, the entity may decrypt encrypted information in which an electronic watermark has been embedded and that is output by a different entity.

In addition, in order to examine the legality of the electronic watermark and the encryption process, the entity may compare a value that is obtained by using a one-way compression function to transform the encrypted information in which the electronic watermark is embedded and that is output by the different entity with a value that is output by the different entity.

According to an another aspect of the present invention, an electronic information distribution system, for exchanging digital information across a network constituted by a plurality of entities, comprises an entity for performing at least an encryption process and an electronic watermark embedding process for the digital information, and an entity for at the least examining the legality of either the encryption process or the electronic watermark embedding process.

The entity for examining the legality may be an entity for managing an encryption key.

According to an another aspect of the present invention, for the exchange of digital information by a first entity and a second entity in a network constituted by a plurality of entities, the first entity at the least embeds electronic watermark information in the digital information either before or after a first encryption process, and transmits the obtained digital information to the second entity. At the least, either before or after a second encryption process the second entity embeds electronic watermark information in the digital information received from the first entity, and transmits the obtained digital information to a third entity. The third entity examines the legality of the electronic watermark information that has been embedded, and notifies the first entity of the result of the examination.

According to an another aspect of the present invention, for the exchange of digital information by a first entity and a second entity in a network constituted by a plurality of entities, the first entity embeds electronic watermark information in the digital information before a first encryption process, and transmits the obtained information to the second entity. Before a second encryption process, the second entity embeds electronic watermark information in the information received from the first entity, and transmits the obtained information to a third entity. The third entity examines the legality of the electronic watermark information that is embedded, and transmits the result and the information received from the second entity to the first entity. The first entity performs a decryption process, corresponding to the first encryption process, for the information received from the second entity, and transmits to the second entity the thus obtained first decrypted information. Thereafter, the second entity performs a second decryption process, corresponding to the second encryption process, for the first decrypted information received from the first entity.

The electronic watermark information embedded by the first entity may include information concerning the second entity.

The electronic watermark information embedded by the first entity may include information concerning digital information to be transmitted.

The electronic watermark information embedded by the second entity may be information that only the second entity is capable of creating.

In this aspect of the present invention, before embedding the electronic watermark, the first entity examines a signature of the second entity by using an anonymous public key having a certificate that is issued by an authentication center.

According to an another aspect of the present invention, provided is an image file apparatus for storing, in addition to image information to which electronic watermark information has been added, key information for encrypting the image information, and a one-way compression function for transforming the image information.

The electronic watermark information may be information that is encrypted together with the image information and is decrypted together with the image information.

According to an another aspect of the present invention, a cryptography method comprises the steps of:

calculating second data using first data encrypted by a public key encryption method; and decrypting third data that is obtained by said calculation step, in order to accomplish the decryption of the first data and the signing of the second data.

In this aspect of the present invention, the first data are encrypted image data, and image data in which an electronic watermark has been embedded are obtained by decrypting the third data.

In this aspect of the present invention, the first data are data obtained by the secondary encryption, using the public key encryption method, of primary encrypted information.

According to an another aspect of the present invention, provided is a cryptography method used for a network that includes a plurality of entities, whereby for the exchange of digital information, at least by a first entity and a second entity of the plurality of entities, the first entity calculates second data using first data, which is encrypted using a public key belonging to the second entity, and transmits the third data that is obtained to the second entity; and whereby the second entity employs a self owned-secret key to decrypt the third data received from the first entity, and implements the decryption of the first data and the signing of the second data.

According to an another aspect of the present invention, provided is a cryptography method for a network that includes a plurality of entities, whereby for the exchange of digital information, at least between a first entity and a second entity of the plurality of entities, the second entity employs a self-owned public key for encrypting the first data that have been encrypted using a public key belonging to the first entity, and transmits the resultant first data to the first entity; the first entity employs a self-owned secret key to decrypt the first data received from the second entity, performs calculations with second data using the decrypted first data to obtain third data, and transmits the third data to the second entity; and the second entity employs a self-owned secret key to decrypt the third data received from the first entity, and implements the decryption of the first data and the signing of the second data.

In this aspect of the present invention, the first entity provides information, and the second entity receives information.

In this aspect of the present invention, cryptography is performed using a public key method for which RSA cryptography is employed.

According to an another aspect of the present invention, provided is an electronic information distribution system, which includes a plurality of entities and exchanges digital information across a network, wherein the plurality of entities includes at least a first and a second entity for exchanging digital information; wherein the first entity includes calculation means for performing calculations with second data using the first data that are encrypted by employing a public key belonging to the second entity, and for obtaining third data; and wherein the second entity includes decryption means for using a self-owned secret key to decrypt the third data received from the first entity.

According to an another aspect of the present invention, provided is an electronic information distribution system, which includes a plurality of entities and exchanges digital information across a network, wherein the plurality of entities include at least a first and a second entity for exchanging digital information; wherein the first entity includes first encryption means for encrypting first data using a self-owned public key, first decryption means for using a self-owned secret key to decrypt first data received from the second entity, and calculation means that, to obtain third data, performs calculations with second data using the first data decrypted by the first decryption means; and wherein the second entity includes second encryption means for using a self-owned public key to encrypt the first data that are encrypted by the first encryption means of the first entity, and second decryption means for using a self-owned secret key to decrypt the third data received from the first entity.

In this aspect of the present invention, a public key cryptography method using RSA cryptography is employed.

In this aspect of the present invention, the first entity supplies information and the second entity receives information.

In this aspect of the present invention, the first data are image data and the second data are electronic watermark information.

BRIEF DESCRIPTION OF THE DRAWINGS

FIG. 6 is a diagram showing a general image format;

FIG. 9 is a diagram showing attribute information stored in an Image Content Property Set area of the file format;

FIG. 10 is a diagram showing an example image file constituted by a plurality of images having different resolutions;

DETAILED DESCRIPTION OF THE PREFERRED EMBODIMENTS

A first embodiment of the present invention will now be described while referring to FIG. 4.

Figure 1:
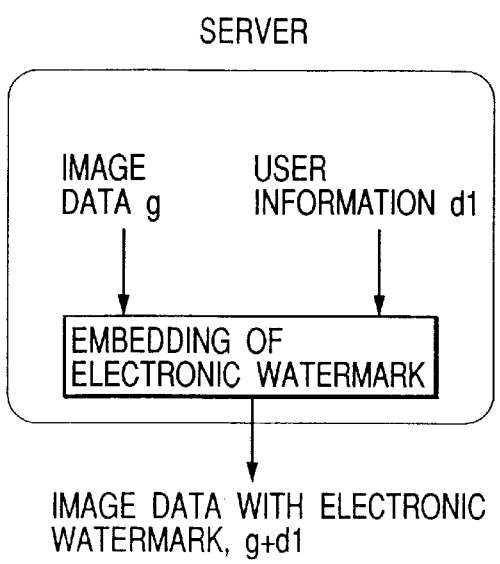
FIG. 1 is a diagram for explaining a conventional electronic watermark system.
Figure 2:
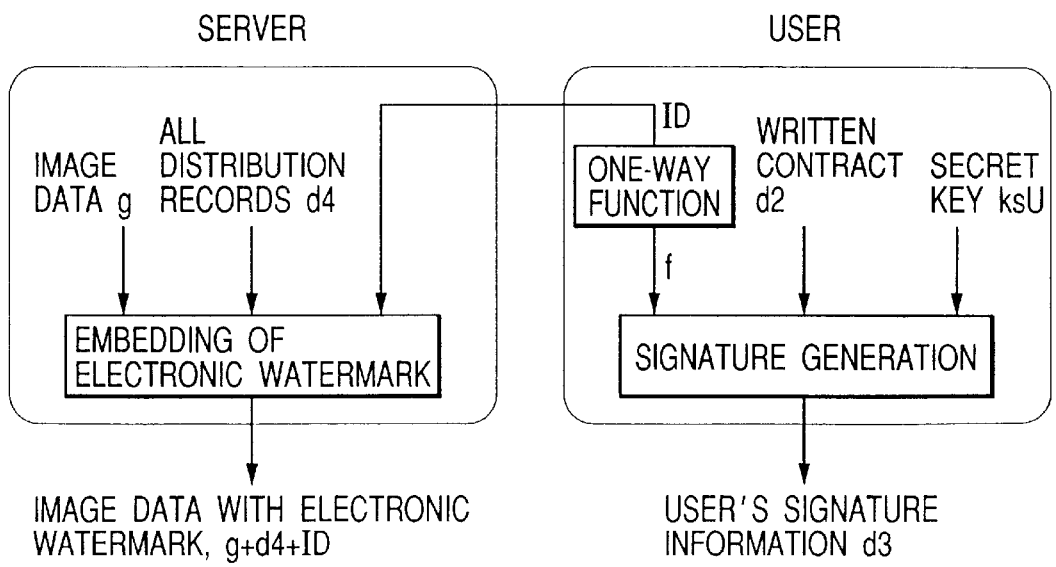
FIG. 2 is a diagram for explaining a conventional electronic watermark system obtained by improving the method in FIG. 1.
Figure 3:
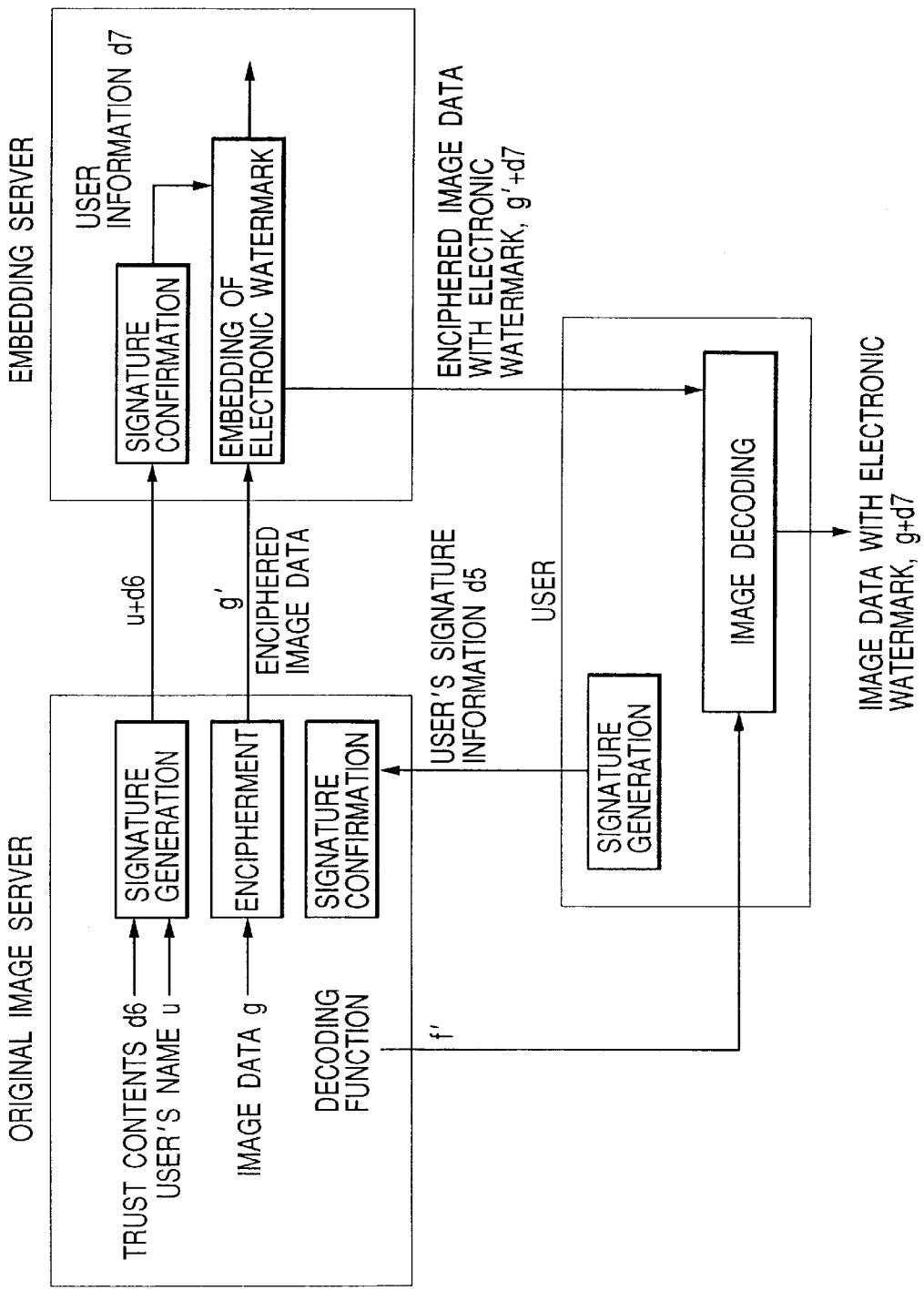
FIG. 3 is a diagram for explaining a conventional electronic watermark system obtained by improving the method in FIG. 2.
Figure 4:
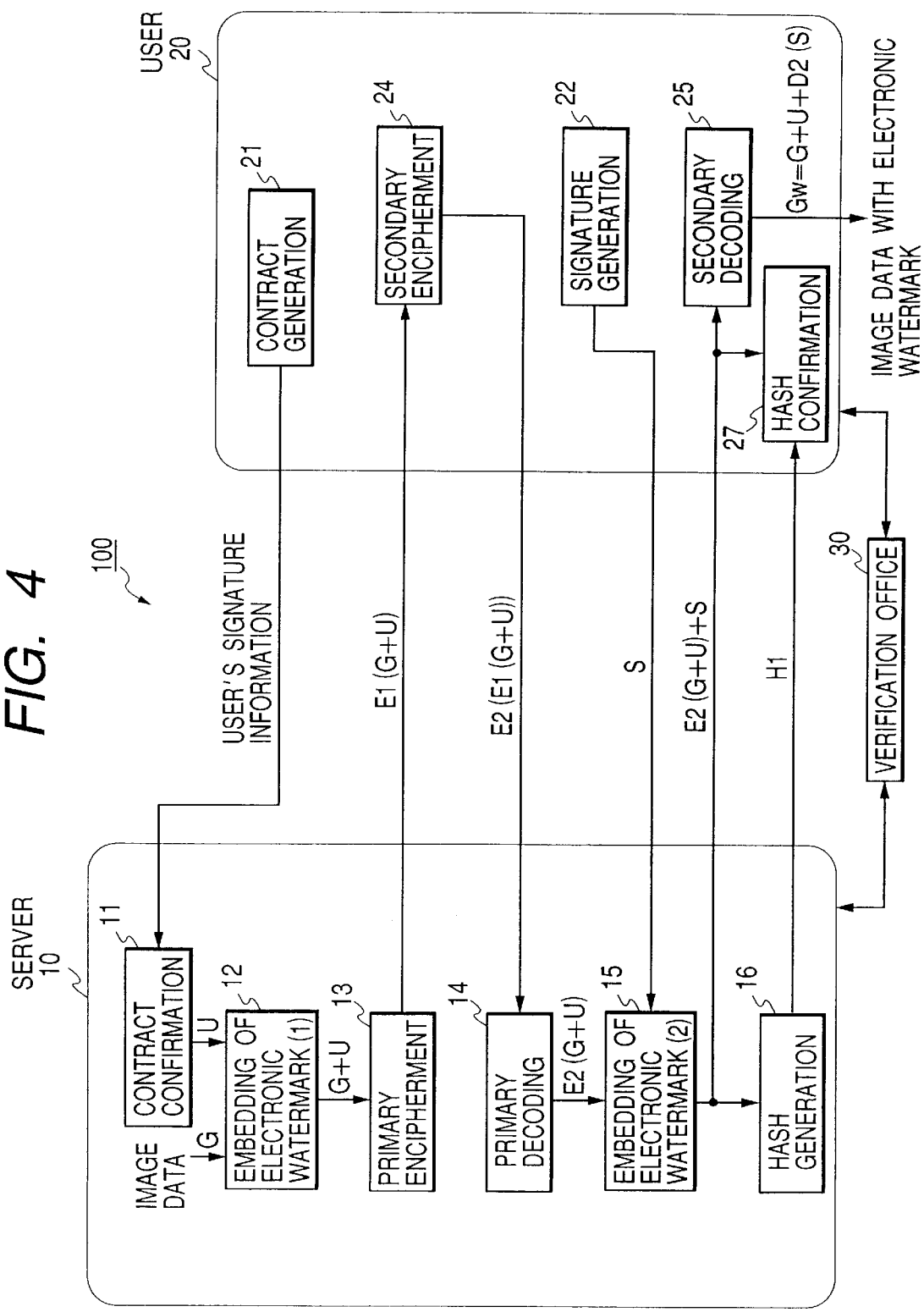
FIG. 4 is a diagram for explaining an electronic watermark system according to a first embodiment of the present invention.

An electronic watermark method according to the present invention is performed by a system 100 shown in FIG. 4 for which an electronic information distribution system according to the present invention is applied.

The system 100 is a network, constituted by multiple entities (not shown), that includes a terminal 10 at the server side (a server terminal), a terminal 20 at the user side (a user terminal), and a terminal 30 at the verification office side (a verification office). The individual entities exchange digital data across the network.

The server terminal 10 comprises: a contract confirmation unit 11, for receiving data from the user terminal 20; a first electronic watermark embedding unit 12, for receiving, for example, image data (digital data); a primary encryption unit 13, for receiving the output of the first electronic watermark embedding unit 12; a primary decryption unit 14, for receiving data from the user terminal 20; a second electronic watermark embedding unit 15, for receiving data from the user terminal 20 and output from the primary decryption unit 14; and a hash generator 16 for receiving the output of the second electronic watermark embedding unit 15. The outputs of the primary encryption unit 13 and the hash generator 16 are transmitted to the user terminal 20, and the output of the second electronic watermark embedding unit 15 is transmitted both to the hash generator 16 and to the user terminal 20.

The user terminal 20 comprises: a contract generator 21, for transmitting data to the contract confirmation unit 11 of the server terminal 10; a signature generator 22; a secondary encryption unit 24, for receiving data from the primary encryption unit 13 of the server terminal 10; a secondary decryption unit 25, for receiving data from the primary decryption unit 14 and from the electronic watermark embedding unit 15 of the server terminal 10; and a hash confirmation unit 27, for receiving data from the second electronic watermark embedding unit 15 and the hash generator 16 of the server terminal 10. The data produced by the secondary decryption unit 25 are output as image data for which an electronic watermark is provided. The data produced by the secondary encryption unit 24 are transmitted to the primary decryption unit 14 of the server terminal 10, and the data produced by the signature generator 23 are output to the secondary electronic watermark embedding unit 15 of the server terminal 10.

In the above system 100, information concerning the primary encryption process, such as the method used and a secret key, is only that which is available to the server, and information concerning the secondary encryption process is only that which is available to the user. It should be noted that a property both of the primary encryption process and the secondary encryption process is that regardless of whichever encryption process is performed first, a message can be deciphered by the decryption process.

Hereinafter, the encryption process is represented by "Ei( )", the decryption process is represented by "Di( )" and the embedding process concerning an electronic watermark is represented by "+".

The processing performed by the thus arranged system 100 will now be explained. First, the embedding process for an electronic watermark will be explained.

Embedding Process

1) First, to obtain desired image data G, the user terminal 20 issues to the server terminal 10 a request bearing the user's signature. The requested data is information (user's signature information) that is generated by the contract generator 21 and that is hereinafter called contract information.

2) The contract confirmation unit 11 in the server terminal 10 employs the user's signature to verify the received contract information, and then uses the contract information to prepare user information U. The first electronic watermark embedding unit 12 embeds, in the requested image data G, the user information U prepared by the contract confirmation unit 11. The first encryption unit 13 performs the primary encryption process E1( ) for the image data (G+U) using the user information U that is embedded, and transmits the obtained data to the user terminal 20. In this fashion, the user terminal 20 receives the primary encrypted image data E1(G+U).

3) The secondary encryption unit 24 of the user terminal 20 performs the secondary encryption of the primary encrypted image data E1(G+U) that have been received from the server terminal 10, and transmits the obtained secondary encrypted image data E2(E1(G+U)) to the server terminal 10. At this time, the user acquires his or her secret key from the signature generator 22, and prepares signature information S and transmits it to the server terminal 10.

4) The primary decryption unit 14 in the server terminal 10 decrypts the primary encrypted data of the secondary encrypted image data E2(E1(G+U)) received from the user terminal 210. The second electronic watermark embedding unit 15 confirms the signature information S received from the user terminal 20, embeds the signature information S in the image data E2(G+U) generated by the primary decryption unit 14, and transmits the obtained data to the user terminal 20. The hash generator 16 generates a hash value H1 for the data E2(G+U)+S that is to be transmitted to the user terminal 20, signs it, and, along with the data E2(G+U)+S, transmits the obtained hash value H1 to the user terminal 20. As a result, the user terminal 20 receives the data E2(G+U)+S, the hash value H1, and its signature.

The hash value is a value obtained by calculating the hash function h( ), and the hash function is a compression function that seldom causes a collision. A collision in this case would mean that for the different values x1 and x2, h(x1)=h(x2). The compression function is a function for converting a bit string having a specific bit length into a bit string having a different bit length. Therefore, the hash function is a function h( ) by which a bit string having a specific bit length is converted into a bit string having a different bit length, and for which values x1 and x2 that satisfy h(x1)=h(x2) seldom exist. Since a value x that satisfies y=h(x) is not easily obtained from an arbitrary value y, accordingly, the hash function is a one-way function. Specific examples for the hash function are an MD (Message Digest) 5 or an SHA (Secure Hash Algorithm).

5) Next, the hash confirmation unit 27 in the user terminal 20 confirms the hash H1 and its signature transmitted from the server terminal 10 to confirm that the hash value H1 matches a hash value generated from the data E2(G+U)+S. After this confirmation, the data E2(G+U)+S, thea hash value H1 and its signature are stored.

Then, the secondary decryption unit 25 decrypts the secondary encrypted data E2(G+U)+S transmitted from the server terminal 10 to extract image daga Gw to which the electronic watermark is added. Therefore, the electronic watermark-added image data Gw is represented as Gw=G+U+D2(S). This represents that the user informaiton U and the signature information S influenced by the secondary cipher are embedded as watermark information in the original image data G.

As is described above, according to the electronic watermark method of the present invention, since the server performs the embedding of electronic watermark information, basically, the user can not perform an illegal activity. The server receives the signature information S directly from the user and embeds it in the data as electronic watermark information; however, since the signature information D2(S) that is obtained by the user in the conversion procedure in 5) of the embedding process is affected by the secondary encryption process that is known only by the user, the server can not embed the signature information D2(S) directly in original image and then lay the blame for the crime on the user.

When an illegal copy (an illegal image) is found, the following verification process is performed to identity an unauthorized person. It should be noted that, as in the above references 1 and 2, the image data are not affected by the modification or the deletion of electronic information.

Verification Process

1) First, the server terminal 10 extracts user information U' from the illegal image Gw'=G+U'+D2(S') that was found.

2) The server terminal 10 transmits to the verification office 30 the illegal image Gw' and the extracted user information U', and requests that an examination of the user be made.

3) The verification office 30 requests that the user submit to it the secondary encryption key that the user has saved, and to extract the signature information S', uses the submitted encryption key to perform a secondary encryption process for the illegal image Gw'.

4) When the correct signature information (S'=S) is extracted, the verification office 30 determines that an illegal activity has been performed the user.

5) When the correct signature information can not be extracted, the verification office 30 requests that the user submit the data E2(G+U)+S, its hash value H1 and its signature, all of which are transmitted by the server terminal 10 to the user terminal 20, verifies the hash value H1 and the signature, and confirms that the hash value Hi matches a hash value generated for the data E2(G+U)+S. After making this confirmation, according to the procedure 3) in the verification process, the verification office 30 decrypts the data E2(G+U)+S using the secondary encryption key that is submitted by the user, and extracts image data Gw having an electronic watermark.

6) When the verification office 30 can not extract correct image data Gw using an electronic watermark, the office 30 ascertains that an illegal activity has been performed by the user. This means that the secondary encryption key submitted at the procedure step 3) of the verification process is not correct.

7) When correct image data having an electronic watermark is extracted, the verification office 30 determines ascertains that an illegal activity has been performed by the server.

As is apparent from the above verification process, the terminal of the verification office 30 can perform the same functions as does the secondary encryption unit 24, the secondary decryption unit 25, and the hash confirmation unit 27 of the user terminal 20.

As is described above, according to the first embodiment, since the advantages accruing to a server and to a user conflict, collusion between the two does not occur. Therefore, since if the user does not embed correct signature information this fact can be detected from the reproduced image during the verification process, the user can not perform an illegal activity. And further, since during the embedding process the signature information affected by the secondary encryption at the user side is not available to the server, the server can also not perform an illegal activity. And finally, until an illegal image is discovered there is no need for the verification office, as until an illegal image is discovered the fact that an illegal activity has been performed can not be established.

If the procedures for the above verification process are well known, and if both a user and a server are aware of the results that can be provided by the process, an illegal activity performed by the user or by the server can be detected even if a verification office is not provided.

Next, a second embodiment of the present invention will be explained hereinafter.

Recently, the transfer of money across networks, a fund transfer procedure that is called electronic cash, has come to be employed. Since as with a regular cash payment, the name of the owner of an electronic cash transfer is not identified, anonymity is attained. If the attainment of anonymity were not possible, a seller of a product could obtain from an electronic cash transfer information concerning a purchaser and the use of its product, and the privacy of a user would not be protected. Therefore, the protection of the privacy of a user is as important as is the protection of a copyright for a creator who uses an electronic watermark.

In the second embodiment, therefore, the anonymity of a user is provided for a purchase, and when an illegality, such as illegal distribution of images, is found, it is possible to identify an unauthorized distributor, which is the original purpose of an electronic watermark. This is achieved by, for example, a system 200 shown in FIG. 5.

The system 200 has the same structure as the system 100 according to the first embodiment, with an anonymous public key certificate that is issued by a verification office 30 being provided for a user terminal 20.

Generally, in order to authenticate signature information, a certificate issued by an organization called a verification office is added to a public key that is used for examining the signature information.

The verification office is an organization that issues certificates for public keys belonging to users in order to provide authentication for public keys in accordance with the public key encryption system. That is, the verification office employs a secret key it owns to provide a signature for the public key of a user or for data concerning the user, and for this purpose prepares and issues a certificate. When a user receives from another user a signature that is accompanied by a certificate, the user examines the certificate using the public key of the verification office to verify the authentication provided by the user who transmitted the public key (at least the fact that authentication has been provided the user by the verification office). Both VeriSign and CyberTrust are well known organizations that operate such verification offices.

Figure 5:
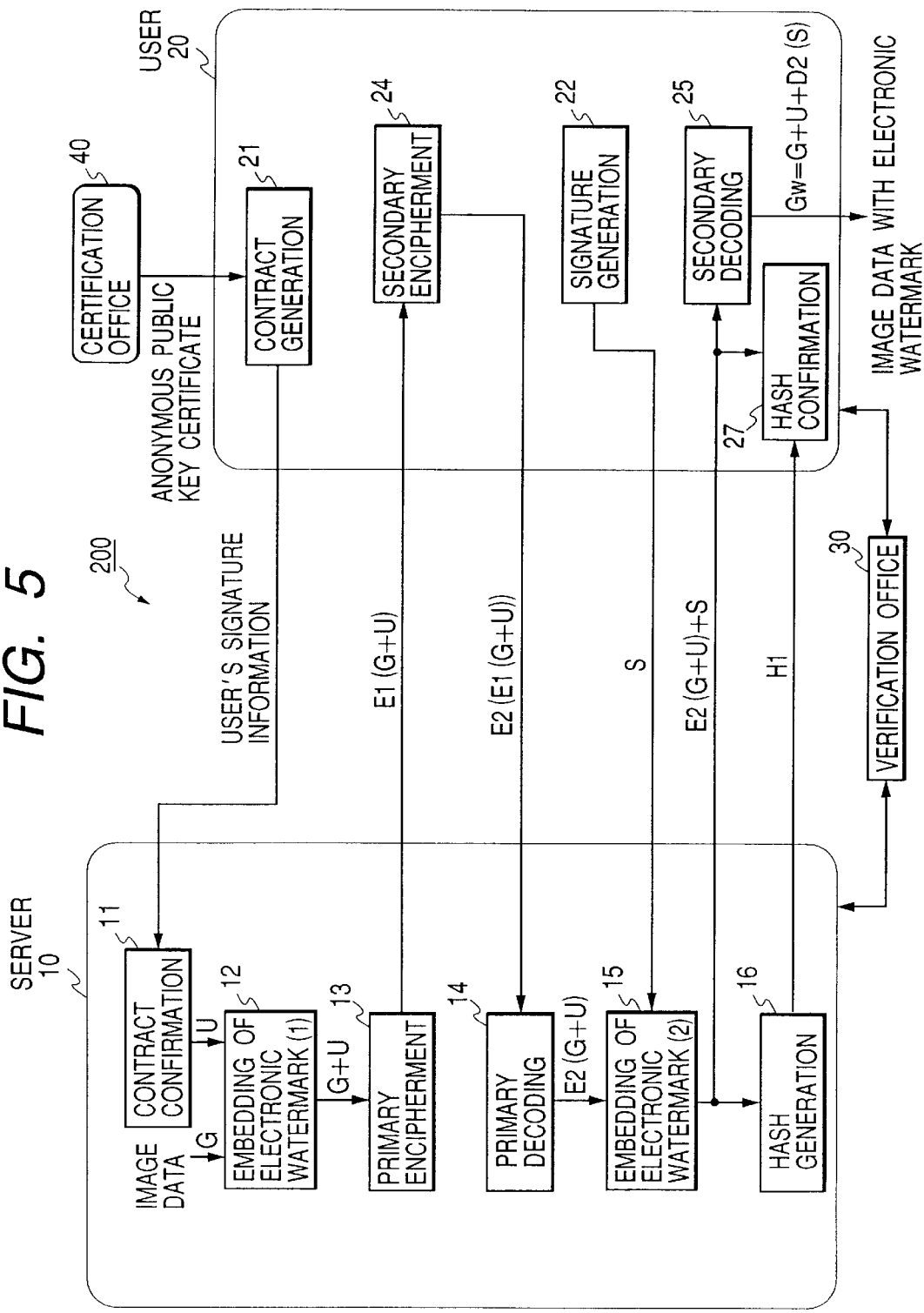
FIG. 5 is a diagram for explaining an electronic watermark system according to a second embodiment of the present invention.

When at procedure 2) of the embedding process in the first embodiment a server examines a signature to verify the contract information for a user, the server can employ the public key with a signature issued by the verification office 30 in FIG. 5. However, since the name of the owner of the public key is generally written in the certificate, user anonymity is not provided at the time data are purchased.

On the other hand, if the verification office 30 keeps secret the correspondence of public keys and their owners, the name of an owner may not be written in the certificate for a public key. An anonymous certificate for a public key is hereinafter called an "anonymous public key certificate", and a public key for which such a certificate is provided is called an "anonymous public key with a certificate". In procedure 1) of the above described embedding process, when the user terminal 20 transmits to the server terminal 10 not only contract information but also the anonymous public key with a certificate so that the contract information for the signature and the signature information S can be examined, the user can remain anonymous when purchasing digital data.

The server terminal 10 receives the anonymous public key with the certificate as information to be used for identifying a user. When an illegal copy is found, the server terminal 10 submits the anonymous public key with the certificate to the verification office 30 and in turn obtains the name of the user to whom the public key corresponds, so that the user can be identified. Consequently, the procedures 1) and 2) of the embedding process and the procedures 1) and 2) of the verification process in the first embodiment are modified as follows in order both to provide anonymity for a user when purchasing digital data and to identify an unauthorized user when the performance of an illegal activity is discovered.

The embedding process and the verification process performed by the system 200 in FIG. 5 will be specifically explained.

As the same reference numerals as are used for the system 100 in FIG. 4 are also employed to denote corresponding or identical components in the system 200 in FIG. 5, no specific explanation will be given for components other than those for whom different reference numerals are allocated. And since the processing in the second embodiment is the same as that in the first embodiment, except for procedures 1) and 2)of the embedding process and procedures 1) and 2) of the verification process, no detailed explanation of the processing will be given.

Embedding Process

1)First, in the user terminal 20, a contract generator 21 provides, for contract information for requesting desired image data, a signature that corresponds to an anonymous public key with a certificate issued by a verification office 30, and together with the anonymous public key with the certificate, transmits the contract information to the server terminal 10.

2) In the server terminal 10, a contract confirmation unit 11 uses the public key of the verification office 30 to examine the public key of the user, following which it verifies the signature provided for the contract information using the anonymous public key of the user and prepares user information U by the use, at the least, of either the contract information or the anonymous public key with the certificate. A first electronic watermark embedding unit 12 embeds, in requested image data G, the user information U that is prepared by the contract confirmation unit 11. A primary encryption process E1( ) for the resultant image data G, and transmits the obtained data to the user terminal 20. In this manner, the user terminal 20 receives primary encrypted image data E1 (G+U).

Hereinafter, the procedures 3) to 5) of the embedding process in the first embodiment are performed.

Verification Process

1) The server terminal 10 extracts user information U' from an illegal image Gw' that is discovered, and submits to the verification office 30 the extracted user information U' and an anonymous public key, which is obtained from the contract information, to acquire the name of a user who corresponds to the anonymous public key.

2) The server terminal 10 submits to the verification office 30 the illegal image Gw', the user extracted user information U' and the name of the user, and requests that a verification process be performed for the user.

Then, the procedures 3) to 7) of the verification process in the first embodiment are performed.

As is described above, according to the present invention, the user can remain anonymous, even so far as the verification office is concerned, when purchasing digital data.

Various data, to include image data in the first and the second embodiment and a hash value obtained during the embedding process for an electronic watermark, can be stored in the following image format. According to the following general image format, for example, image data that are transmitted at individual steps can be stored in an image data portion, and a corresponding hash value and its signature can be stored in an image header portion. Furthermore, a hash value and its signature, which the user must retain, and the secondary encryption key can be stored in the image header portion, while image data having an electronic watermark can be stored in the image data portion.

According to the following file format, the general image format, which includes the hash value and the signature, can be stored as data in each layer. And the hash value and the signature may be stored as attribute information in a property set.

The general image format will now be explained.

According to the general image format, an image file is divided into an image header portion and an image data portion, as is shown in FIG. 6.

Generally, in the image header portion are stored information required for reading image data from an image file, and additional information for explaining the contents of an image. In the example in FIG. 6 are stored an image format identifier describing the name of an image format, a file size, the width, height and depth of an image, information as to whether data are compressed or not, a resolution, an offset to an image data storage location, the size of a color palette, etc. Image data are sequentially stored in the image data portion. Typical examples of such image formats are the BMP format of Microsoft and the GIF format of Compuserve.

Another file format will now be explained.

According to the following file format, attribute information stored in the image header portion and the image data stored in the image data portion are rearranged more as a structure and are stored in the file. The structured image file is shown in FIGS. 7 and 8.

The individual properties and data in the file are accessed as storage and streams that correspond to the directories and files of MS-DOS. In FIGS. 7 and 8, the shaded portions are storage and the unshaded portions are streams. Image data and image attribute information are stored in the streams.

Figure 7:
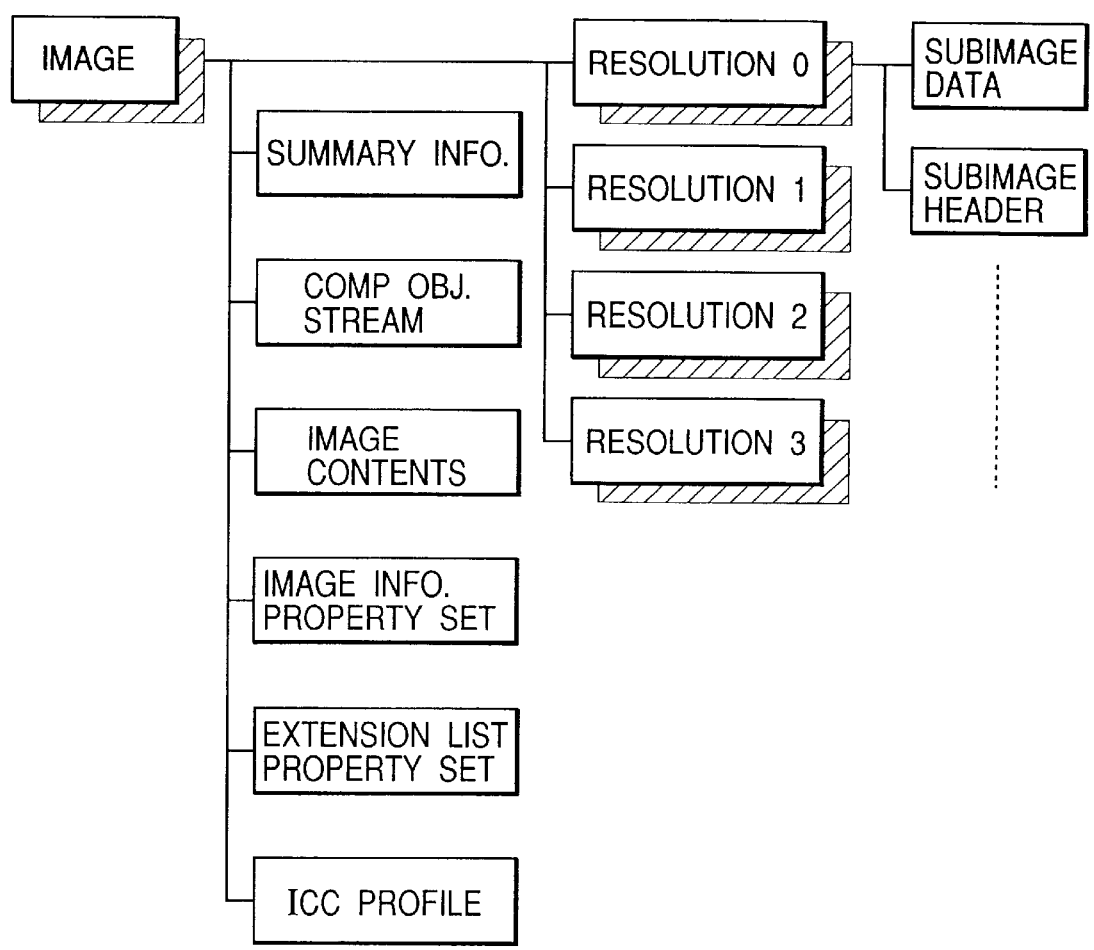
FIG. 7 is a diagram showing an example file format.
Figure 8:
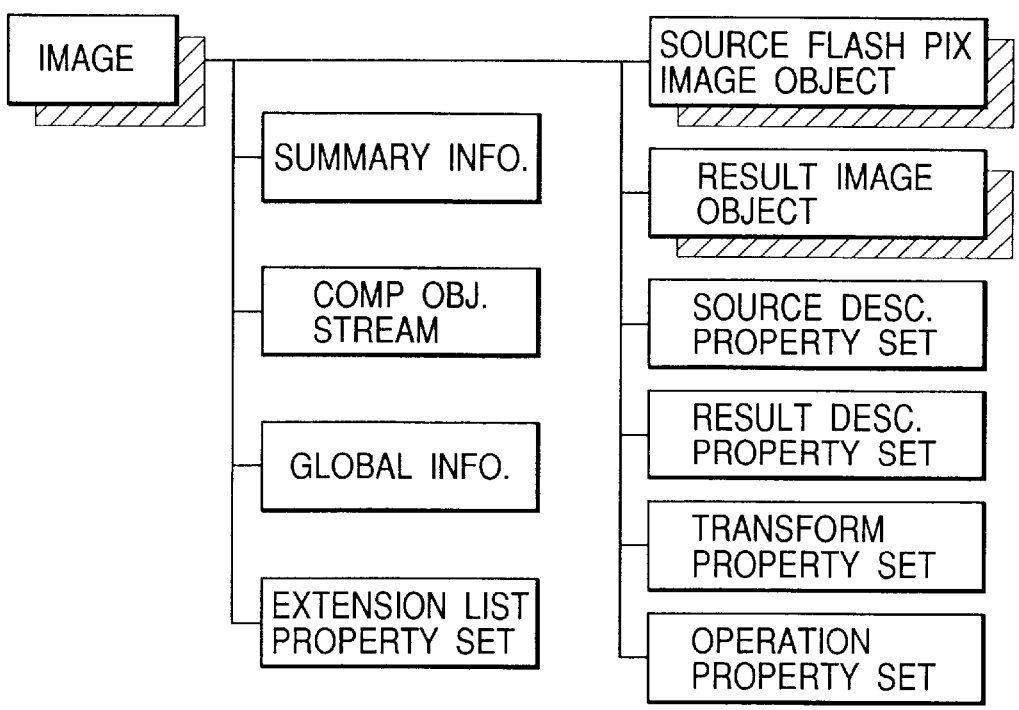
FIG. 8 is a diagram showing another example file format.

In FIG. 7, the image data are arranged hierarchically in accordance with different resolutions, with an image at each resolution being called a Subimage and being represented by a Resolution 0, 1, . . . , or n. For an image at each resolution, the information that is required for the reading of the image data is stored in a Subimage Header area, and the image data are stored in a Subimage data area.

The property sets, which are composed of attribute information that is defined by sorting it in consonance with the purpose for which it is used and its contents, comprise Summary Info. Property Sets, Image Info. Property Sets, Image Content Property Sets and Extension List Property Sets. Explanation for Each Property Set A Summary Info. Property Set is not an inherent part of this file format, but is required for structured storage for Microsoft for storing the tile of a file, the name, the author, and the thumb-nail image.

General information concerning a storage unit (Storage) is stored in the Com Obj. Stream.

An Image Content Property Set is an attribute for describing a storage method for image data (see FIG. 9). For this attribute there are provided the number of layers of image data, the width and height of an image at the maximum resolution, the width, the height and the color of an image at each resolution, and the definition of a quantization table or a Huffman table used for JPEG compression.

An Extension List Property Set is an area used to add information that is not included in the basic specification of the above file format.

In an ICC Profile area is described an ICC (International Color Consortium) specified conversion profile for color spatial conversion.

In an Image Info. Property Set are stored various types of information that can be utilized to employ image data, for example, the following types of information that describe how an image is fetched and how it can be used:

information concerning a fetching method or a generation method for digital data;
  information concerning a copyright;
  information concerning the contents of an image (a person or the locale of an image);
  information concerning a camera used to take a photograph;
  information concerning the setup for a camera (exposure, shutter speed, focal distance, whether a flash was used, etc.);

information concerning a resolution unique to a digital camera and a mosaic filter;

information concerning the name of the maker and the model name of the camera, and the type (negative/positive, or color/monochrome);

information concerning the type and the size when the original is a book or other printed matter; and information concerning a scanner and a software application that was used to scan an image, and the operator.

An Image View Object in FIG. 8 is an image file in which a viewing parameter, which is used to display an image, and image data are stored together. The viewing parameter is a set of stored coefficients for adjusting the rotation, the enlargement/reduction, the shifting, the color conversion and the filtering processing for an image when it is displayed. In FIG. 8, in a Global Info. Property Set area, is written a locked attribute list, for example, an index for a maximum image, an index for the most altered item, and information concerning the person who made the last correction.

Furthermore, a Source/Result Image Object is the substance of the image data, while a Source Object is requisite and a Result Image Object is optional. Original image data are stored in the Source Object area, and image data obtained by image processing using the viewing parameter are stored in the Result Object area.

Source/Result Desc. Property Set is a property set used to identify the above image data. An image ID, a property set for which changes are inhibited, and the date and the time of the last update are stored in this area.

In a Transform Property Set area are stored an Affine conversion coefficient used for the rotation, the enlargement/reduction and the shifting of an image, a color conversion matrix, a contrast adjustment value and a filtering coefficient.

An explanation will now be given of how image data is handled. Employed for this explanation is an image format that includes a plurality of images having different resolutions that are obtained by dividing an image into a plurality of tiles.

In FIG. 10 is shown an example image file that is constituted by a plurality of images having different resolutions. In FIG. 10, an image having the highest resolution consists of X0 columns x Y0 rows, and an image having the next highest resolution consists of X0/2 columns x Y0/2 rows. The number of columns and the number of rows are sequentially reduced by ½ until the columns and rows are equal to or smaller than 64 pixels, or the columns and the rows are equal.

As a result of the layering of image data, the number of layers in one image file is required image attribute information, and the header information and the image data, which have been explained for the general image format, are also required for an image at each layer (see FIG. 6). The number of layers in one image file, the width and height of an image at its maximum resolution, the width, the height and the color of an image having an individual resolution, and a compression method are stored in the Image Content Property Set area (see FIG. 9).

Figures 11, 12:
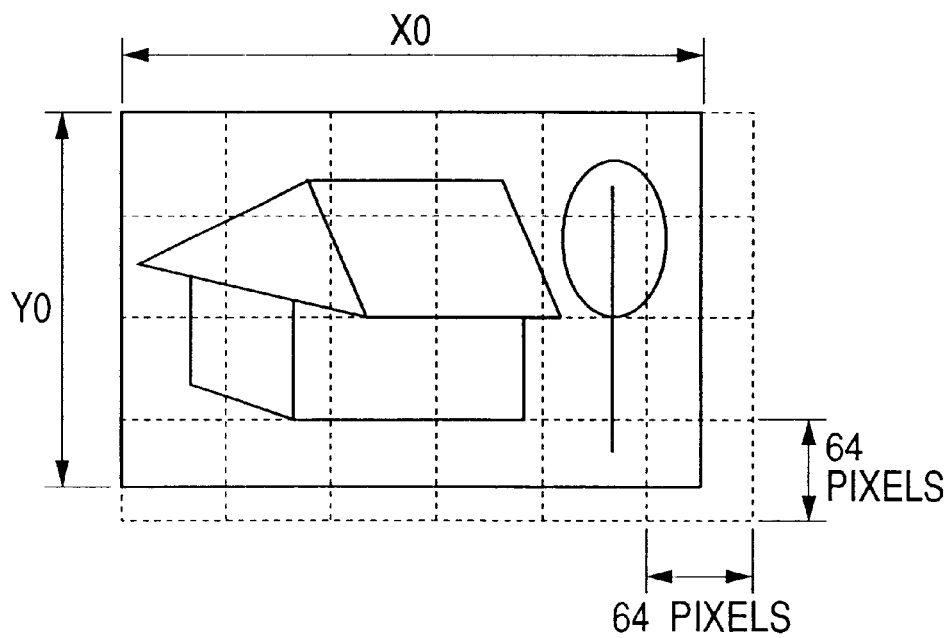
FIG. 11 is a diagram showing the division into tiles of an image having different resolution layers.
FIG. 12 is a table showing attribute information concerning image data obtained by tile division.

The image at a layer at each resolution is divided into tiles, each of which is 64×64 pixels, as is shown in FIG. 11. When an image is divided beginning at the left upper portion into tiles of 64×64 pixels, a blank space may occur in one part of a tile at the right edge or the lower edge. In this case, the rightmost image or the lowermost image is repeatedly inserted to construct 64×64 pixels.

In this format, image data for the individual tiles are stored by using either JPEG compression, the single color, or a non-compressed method. JPEG compression is the image compression technique internationally standardized by ISO/IEC JTC1/SC29, and thus an explanation of this technique will not be given. The single color method is a technique whereby only when one tile is constructed entirely of the same color, the tile is expressed as a single color with no individual pixel values being recorded. This method is especially effective for an image that is generated by computer graphics.

The image data that are thus divided into tiles are stored, for example, in the Subimage data stream in FIG. 7, and the total number of tiles, the sizes of the individual tiles, the location at which data begin, and the data compression method are stored in the Subimage Header area (see FIG. 12).

In the first and the second embodiments, electronic watermark information can be embedded by using various methods, such as the well known methods described in, for example, "Hiding of Static Picture Data Using Pixel Blocks", Shimizu, Numao, Morimoto (IBM, Japan), 53rd Information Processing Institute National Assembly, IN-11, September 1996; or in "Source Spread Spectrum Watermarking for Multimedia", I. J. Cox, J. Kilian, T. Leighton and T. Shamoon (NEC), NEC Research Institute Technical Report 95-10.

The primary encryption and the secondary encryption can also be implemented by employing various methods, such as an encryption system for changing the arrangement of bits in consonance with an encryption key; and a hash value and its signature can be provided for all data that are to be transmitted. In these embodiments, the primary encryption and the secondary encryption are so performed that in the electronic watermark information embedding process the server and the user do not need to exchange information. However, DES (Data Encryption Standard) cryptography or a hash function may be employed to prevent wiretapping and the alteration of data across a communication path by a third party.

Furthermore, in the first and the second embodiments, the server is in charge of the detection of illegal data distribution. However, so long as electronic watermark extraction means is provided, any user can detect an illegal data distribution and information concerning a pertinent user, even though he or she does not know the secret key for the primary encryption and the secondary encryption; and when an illegal distribution is detected, the user need only notify the server for the verification process to be begun. Therefore, the detection of illegal distributions is not limited to the server.

The server terminal 10 can embed in the image data not only the user information U but also other information as needed, such as copyright information and information concerning an image data distribution condition. In addition, to embed secret information, the server terminal 10 need only perform the embedding process after the primary encryption, so that in addition to the signature information, information that is affected by the primary encryption can be embedded in the image data. The user information U is not always embedded before the primary encryption, and may be embedded after the primary encryption (in this case, the detection of the user information U can be performed only by the server or a person who knows the secret key used for the primary encryption).

When a plurality of users share a printer or a terminal, the user's signature information and the secondary encryption may include the signature information and the encryption system for the common printer or terminal. The primary encrypted information from the server terminal 10 may be widely distributed across a network or by using a CD-ROM, even without it being requested by the user terminal 20 based on the contract information.

The signature information S for the user is not necessarily generated by the public key encryption method, but may be information (e.g., a code number) that is defined by the user based on the contracted information.

In the United States, to employ encryption for 40 bits or more, a key management office is required to manage an encryption key in order to prevent the unauthorized use of the cryptograph. The verification office 30, therefore, can also serve as a key management office. And when the verification office 30 provides advance management of the secondary encryption key, the verification office 30 can perform by itself the verification processes 1) to 3) by performing the monitoring for an illegal image. The primary encryption key of the server 10 may be managed either by the verification office 30, or by another key management office. And the keys of the server terminal 10 and the user terminal 20 may be generated and distributed by the key management office.

As is apparent from the above explanation, according to the electronic watermark method and the electronic information distribution system of the present invention, the illegal copying and distribution of digital data can be detected and a culpable person can be identified, so that all illegal activities can be prevented. Therefore, as regards the illegal distribution of digital data, a safe system can be provided. Furthermore, an image file apparatus can be provided that can file image data in which an electronic watermark has been embedded using the electronic watermark method, and that can, in particular, more easily identify embedded electronic watermark information. In addition, this system can easily be applied for a key management office that maintains the anonymity of a user and that prevents the unauthorized use of cryptography.

The other embodiments of the present invention will now be described while referring to the accompanying drawings.

A third embodiment will be described first.

Figure 13:
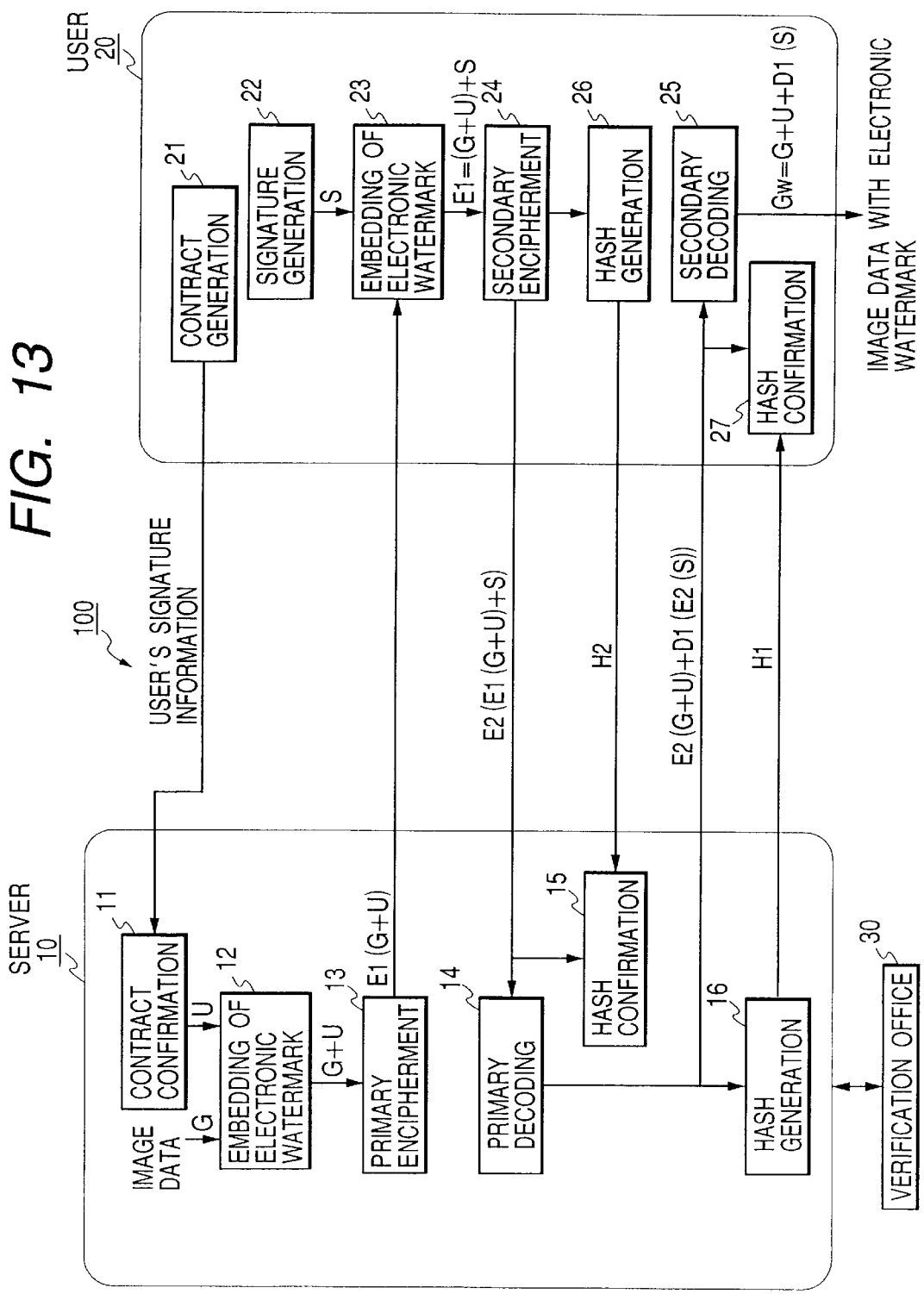
FIG. 13 is a block diagram illustrating the arrangement of an electronic information distribution system according to a third embodiment of the present invention.

An electronic watermark method according to the present invention is performed by a system 100 shown in FIG. 13, for which an electronic information distribution system according to the present invention is applied.

The system 100 is a network constituted by multiple entities (not shown), including a terminal 10 at the server's side (a server terminal) and a terminal 20 at the user's side (a user terminal). The individual entities exchange digital data across the network.

The server terminal 10 comprises: a contract confirmation unit 11, for receiving data from the user terminal 20; an electronic watermark embedding unit 12, for receiving image data (digital data), for example,; a primary encryption unit 13, for receiving the output of the electronic watermark embedding unit 12; a primary decryption unit 14, for receiving data from the user terminal 20; a hash confirmation unit 15, for receiving data from the user terminal 20 and data output by the primary decryption unit 14; and a hash generator 16 for receiving the output of the primary decryption unit 14. The outputs of the primary encryption unit 13 and the hash generator 16 are transmitted to the user terminal 20. And the output of the primary decryption unit 14 is transmitted both to the hash generator 16 and the user terminal 20.

The user terminal 20 comprises: a contract generator 21, for transmitting data to the contract confirmation unit 11 of the server terminal 10; a signature generator 22; an electronic watermark embedding unit 23, for receiving data from the signature generator 22 and from the primary encryption unit 13 of the server terminal 10; a secondary encryption unit 24, for receiving data from the electronic watermark embedding unit 23; a hash generator 26, for receiving data from the secondary encryption unit 24; a secondary decryption unit 25, for receiving data from the primary decryption unit 14 of the server terminal 10; and a hash confirmation unit 27, for receiving data from the primary decryption unit 14 and the hash generator 16 of the server terminal 10. The data output by the secondary decryption unit 25 is image data containing an electronic watermark.

The data output by the secondary encryption unit 24 are transmitted to the primary decryption unit 14 and to the hash confirmation unit 15 of the server terminal 10, and the data output by the hash generator 26 are also transmitted to the hash confirmation unit 15 of the server terminal 10.

In the above system 100, information concerning the primary encryption, such as the method and a secret key, is known only by the server, and information concerning the secondary encryption is known only by the user. It should be noted that a property of both the primary encryption and the secondary encryption is that regardless of whichever encryption is performed first, a message can be deciphered by the decryption.

Hereinafter, the encryption process is represented by "Ei( )", the decryption process is represented by "Di( )", and the embedding process concerning an electronic watermark is represented by "+".

The electronic watermark embedding process performed by the system 100 will now be explained.

Embedding Process

1) First, the user terminal 20 issues a request bearing his or her signature to the server to obtain desired image data G. The requested data is information (user's signature information) that is generated by the contract generator 21 and that is hereinafter called contract information.

2) The contract confirmation unit 11 in the server terminal 10 employs the user's signature to verify the received contract information, and then employs the contract information to prepare the user information U.

The first electronic watermark embedding unit 12 embeds, in the requested image data G, the user information U prepared by the contract confirmation unit 11.

The first encryption unit 13 performs the primary encryption process E1( ) for the image data (G+U) in which the user information U has been embedded, and transmits the obtained data to the user terminal 20.

In this fashion the primary encrypted image data E1(G+U) is received by the user terminal 20.

3) The signature generator 22 of the user terminal 20 generates signature information S using the secret key input by the user.

The electronic watermark embedding unit 23 embeds the signature information S that is generated by the signature generator 22 in the primary encrypted image data E1(G+U) that are received from the server terminal 10.

The secondary encryption unit 24 performs the secondary encryption for the primary encrypted image data E1(G+U)+S in which the signature information S is embedded by the electronic watermark embedding unit 23, and transmits the obtained data to the server terminal 10.

Therefore, the server terminal 10 receives the secondary encrypted image data E2(E1(G+U)+S).

At this time, the hash generator 26 generates a hash value H2 for the secondary encrypted image data E2(E1(G+U)+S), which are to be transmitted to the server terminal 10, provides a signature for the hash value H2, and transmits to the server terminal 10 the obtained value that, except for the signature information S, contains secret information concerning an electronic watermark.

The secret information is information concerning the embedding location and the depth for detecting the electronic watermark, and before transmission, it is encrypted by another encryption method used in common with the server terminal 10.

The hash value is a value obtained by calculating the hash function h( ), and the hash function is a compression function that seldom causes a collision. A collision in this case would mean that for the different values x1 and x2, h(x1)=h(x2). The compression function is a function for converting a bit string having a specific bit length into a bit string having a different bit length. Therefore, the hash function is a function h( ) by which a bit string having a specific bit length is converted into a bit string having a different bit length, and for which values x1 and x2 that satisfy h(x1) h(x2) seldom exist. Since a value x that satisfies y=h(x) is not easily obtained from an arbitrary value y, accordingly, the hash function is one-way function. Specific examples for the hash function are an MD (Message Digest) 5 or an SHA (Secure Hash Algorithm).

4) The hash confirmation unit 15 of the server terminal 10 confirms that the signature on the hash value H2 received from the user terminal 20 matches the hash value of the transmission data, and stores the hash value H2.

The primary decryption unit 14 performs the primary decryption for the secondary encrypted image data E2(E1 (G+U)+S) received from the user terminal 20, and transmits the obtained data to the user terminal 20.

As a result, the user terminal 20 receives image data E2(G+U)+D1(E2(S)).

At this time, the hash generator 16 generates a hash value H1 for the data E2(G+U)+D1(E2(S)) that are to be transmitted to the user terminal 20, provides a signature for the hash value H1, and transmits to the user terminal 20 the obtained hash value H1 with the above image data.

5) The hash confirmation unit 27 of the user terminal 20 confirms that the signature appended to the hash value H1 received from the server terminal 10 matches the hash value of the transmission data, and stores the hash value H1.

The secondary decryption unit 25 performs the secondary decryption for the image data E2(G+U)+D1(E2(S)) received from the server terminal 10, and extracts image data Gw for which an electronic watermark is provided.

The image data Gw that are provided with an electronic watermark is represented by $Gw=G+U+D1(S)$.

This means that the watermark (user information) U and the watermark information (signature information) S that is affected by the primary encryption are embedded in the original image data G.

The image data Gw that are provided with an electronic watermark are stored.

As is described above, the user information U is not affected by the encryption, while the signature information S is affected by the primary encryption performed by the server.

When an illegal copy (an illegal image) is found, a culpable unauthorized user is identified by the following process (hereinafter the process is referred to as a verification process). It should be noted that, as in the above references 1 and 2, the image data are not affected by the modification or the deletion of electronic watermark information.

Verification Process

1) First, the server terminal 10 extracts user information U' from an illegal image Gw' that is discovered, and also performs primary encryption of the data Gw' to extract signature information SI.

2) When correct signature information S is extracted at procedure 1) (S'=S), the server 10 submits it into the verification office 30, which determines that the user has performed an illegal activity.

This is because the signature information S' can be created only by that user, and the server has no information concerning the signature information S'.

The correctness of the signature information S' can be verified by determining whether information defined in advance in the contract information can be output by employing the public key that corresponds to the secret key that the user used to generate the signature information.

3) When correct signature information S can not be extracted (S'≠S) from the illegally distributed image Gw', to request an examination of that image Gw', the server terminal 10 submits to the verification office 30 the secondary encrypted image data E2(E1(G+U)+S) stored in the verification office 30, the hash value H2 and the signature affixed thereto, the secret key for the primary encryption, and secret information concerning the image Gw'.

4) Upon receiving the request submitted at procedure 3), the verification office 30 confirms that the correct signature information S can not be extracted from the illegal image Gw'. Then, the verification office 30 confirms the hash value H2 and its signature that were submitted, and verifies that the hash value of the secondary encrypted image data E2(E1(G+U)+S) matches the hash value H2 that was submitted.

After performing the verification, the verification office 30 performs the primary decryption for the secondary encrypted image data E2(E1(G+U)+S), and confirms that its hash value matches the hash value H1 held by the user. At this time, the signature affixed to the hash value H1 is also verified.

5) When these hash values do not match at procedure 4), the verification office 30 determines that an illegal activity was performed by the user. This means that the secret key for the primary encryption differs for the procedure 4) of the embedding process and the procedure 4) of the verification process.

6) When the two hash values match at procedure 4), the verification office 30 requests that the secondary decryption for the image data E2(G +U+D1(S)) be performed, and extracts the signature information S from the obtained data.

7) When the correct signature information S can not be extracted at procedure 6), the verification office 30 determines that the user performed an illegal activity. 8) When the correct signature information S is extracted at procedure 6), the verification office 30 determines that the user did not perform an illegal activity but that the server did.

As is described above, according to the third embodiment, since the advantages accruing to a server and to a user conflict, collusion between the two does not occur.

Therefore, since if the user does not embed correct signature information this fact can be detected from the reproduced image during the verification process, the user can not perform an illegal activity. And further, since during the embedding process the signature information for the user is not available to the server, the server can also not perform an illegal activity. And finally, until an illegal image is discovered there is no need for the verification office, as until an illegal image is discovered the fact that an illegal activity has been performed can not be established.

A fourth embodiment will now be described.

Recently, the transfer of money across networks, a fund transfer procedure that is called electronic cash, has come to be employed. Since as with a regular cash payment, the name of the owner of an electronic cash transfer is not identified, anonymity is attained. If the attainment of anonymity were not possible, a seller of a product could obtain from an electronic cash transfer information concerning a purchaser and the use of its product, and the privacy of a user would not be protected. Therefore, the protection of the privacy of a user is as important as is the protection of a copyright for a creator who uses an electronic watermark.

In a fourth embodiment, therefore, the anonymity of a user is provided for a purchase, and when an illegality, such as illegal distribution of images, is found, it is possible to identify an unauthorized distributor, which is the original purpose of an electronic watermark. This is achieved by, for example, a system 200 shown in FIG. 14.

The system 200 has the same structure as the system 100 according to the third embodiment, with an anonymous public key certificate that is issued by a verification office 30 being provided for a user terminal 20.

Generally, in order to authenticate signature information, a certificate issued by an organization called a verification office is added to a public key that is used for examining the signature information.

The verification office is an organization that issues certificates for public keys belonging to users in order to provide authentication for public keys in accordance with the public key encryption system. That is, the verification office employs a secret key it owns to provide a signature for the public key of a user or for data concerning the user, and for this purpose prepares and issues a certificate. When a user receives from another user a signature that is accompanied by a certificate, the user examines the certificate using the public key of the verification office to verify the authentication provided by the user who transmitted the public key (at least the fact that authentication has been provided the user by the verification office). Both VeriSign and CyberTrust are well known organizations that operate such verification offices.

When at procedure 2) of the embedding process in the third embodiment a server examines a signature to verify the contract information for a user, the server can employ the public key with a signature issued by the verification office.

However, since the name of the owner of the public key is generally written in the certificate, user anonymity is not provided at the time data are purchased.

On the other hand, if the verification office keeps secret the correspondence of public keys and their owners, the name of an owner may not be written in the certificate for a public key. A public key for which such a certificate is provided is called an "anonymous public key with a certificate".

In procedure 1) of the above described embedding process, when the user transmits to the server not only contract information but also the anonymous public key with a certificate so that the contract information for the signature and the signature information S can be examined, the user can remain anonymous when purchasing digital data. The server receives the anonymous public key with the certificate as information to be used for identifying a user. When an illegal copy is found, the server submits the anonymous public key with the certificate to the verification office 40 and in turn obtains the name of the user to whom the public key corresponds, so that the user can be identified.

Consequently, the procedures 1) and 2) of the embedding process and the procedure 1) of the verification process in the third embodiment are modified as follows in order both to provide anonymity for a user when purchasing digital data and to identify an unauthorized user when the performance of an illegal activity is discovered.

Figure 14:
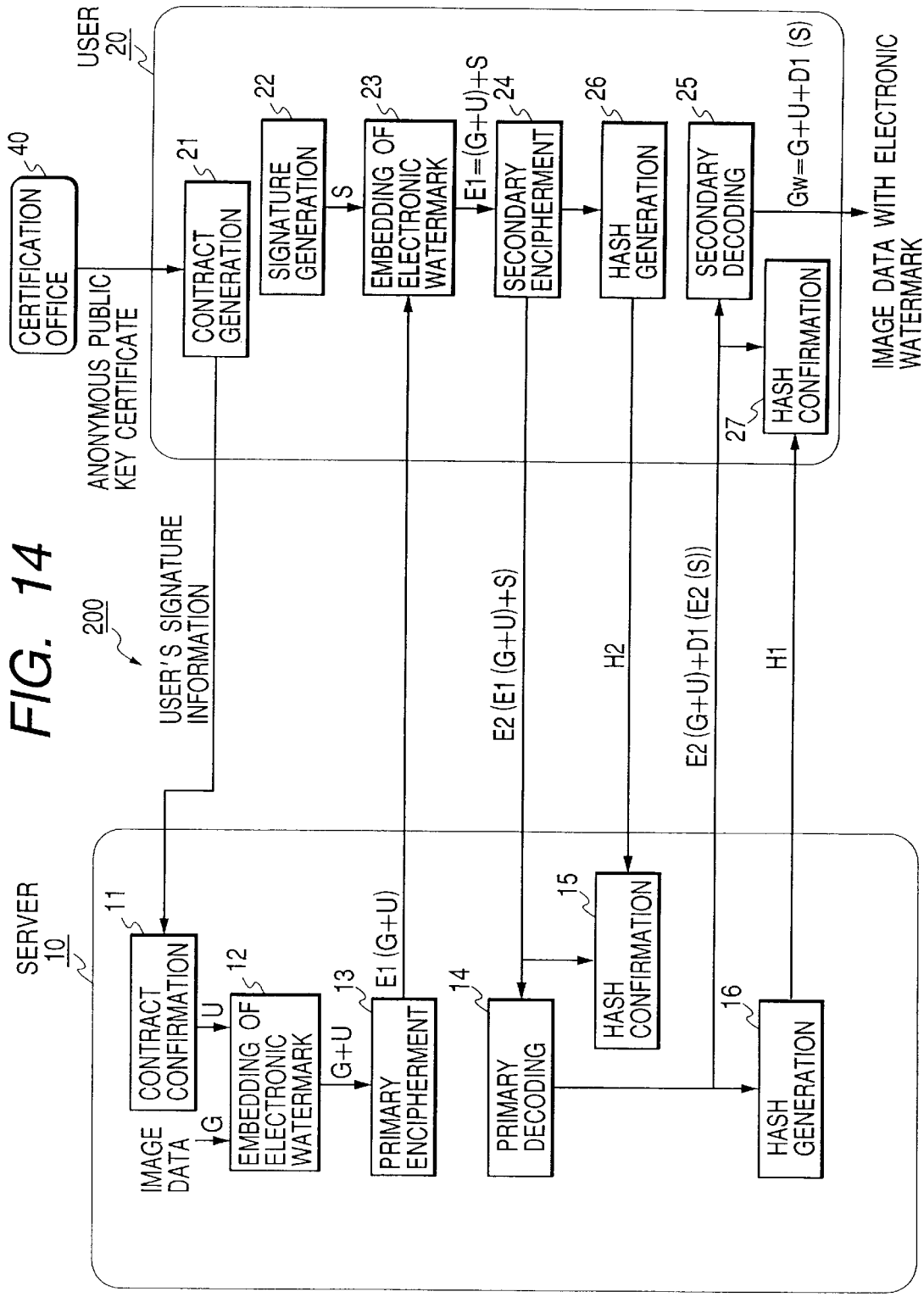
FIG. 14 is a block diagram illustrating the arrangement of an electronic information distribution system according to a fourth embodiment of the present invention.

The embedding process and the verification process performed by the system 200 in FIG. 14 will be specifically explained.

As the same reference numerals as are used for the system 100 in FIG. 13 are also employed to denote corresponding or identical components in the system 200 in FIG. 14, no specific explanation will be given for components other than those for whom different reference numerals are allocated.

And since the processing in the fourth embodiment is the same as that in the third embodiment, except for procedures 1) and 2) of the embedding process and procedure 1) of the verification process, no detailed explanation of the processing will be given.

Embedding Process

1) First, in the user terminal 20, a contract generator 21 provides, for contract information for requesting desired image data, a signature that corresponds to an anonymous public key with a certificate issued by a verification office 30, and together with the anonymous public key with the certificate, transmits the contract information to the server terminal 10.

2) In the server terminal 10, a contract confirmation unit 11 uses the public key of the verification office 30 to examine the public key of the user, following which it verifies the signature provided for the contract information using the anonymous public key of the user and prepares user information U by user, at the least, of either the contract information or the anonymous pubic key with the certificate.

An electronic watermark embedding unit 12 embeds, in requested image data G, the user information U that is prepared by the contract confirmation unit 11. A primary encryption unit 13 performs the primary encryption process E1( ) for the resultant image data G, and transmits the obtained data to the user terminal 20.

In this manner, the user terminal 20 receives primary encrypted image data E1(G+U).

Hereinafter, the procedures 3) to 5) of the embedding process in the third embodiment are performed.

In this case also, the user information U is not affected by the encryption, while the signature information S is affected by the primary encryption performed by the server.

When an illegal copy (an illegal image) is discovered, the following verification process is performed.

Verification Process

1) The server terminal 10 extracts user information from illegal electronic cash Mw', and also extracts signature information S' by performing the primary encryption for the illegal electronic cash Mw'. In addition, the server terminal 10 submits to the verification office 30 an anonymous public key that is obtained in consonance with the illegal electronic cash Mw', the extracted user information and the contract information, and requests the name of the user who corresponds to the anonymous public key.

Thereafter, the procedures 2) to 8) of the verification process in the third embodiment are performed.

As is described above, since in this embodiment, as in the third embodiment, the advantages accruing to the server and the user conflict, collusion between the two does not occur. Therefore, when the user does not embed correct signature information, this fact is detected from the reproduced image during the verification process, so that the user can not perform an illegal activity. Further, since during the embedding process the server has no access to the signature information of the user, the server also can not perform an illegal activity. In addition, the verification office is not necessary until an illegal image is discovered, as that an illegal activity has been performed can not be established before an illegal image is discovered.

Various data, including image data in the third and the fourth embodiment and the hash values obtained in the electronic watermark embedding process, can be stored in the image formats shown in FIGS. 6 to 12.

As is described above, according to the third and the fourth embodiments, since the advantages accruing to the server (the first entity) and the user (the second entity) conflict, collusion between the two does not occur. Therefore, when the user does not embed correct signature information, this fact is detected from the reproduced image during the verification process, so that the performance of an illegal activity by the user can be prevented. Further, since during the embedding process the server has no access to the signature information of the user, the performance of an illegal activity by the server can also be prevented. Further, the verification office is not necessary until an illegal image is found, as an illegal activity can not be performed before an illegal image is found. Therefore, as regards the illegal distribution of digital data, a safe system can be provided, and with this system the anonymity of a user can be easily insured.

Furthermore, an image file apparatus can be provided that can file an image data in which an electronic watermark was embedded using the above described electronic watermark method, and that, in particular, can more easily identify the embedded electronic watermark information.

A fifth embodiment of the present invention will now be described while referring to FIG. 15.

Figure 15:
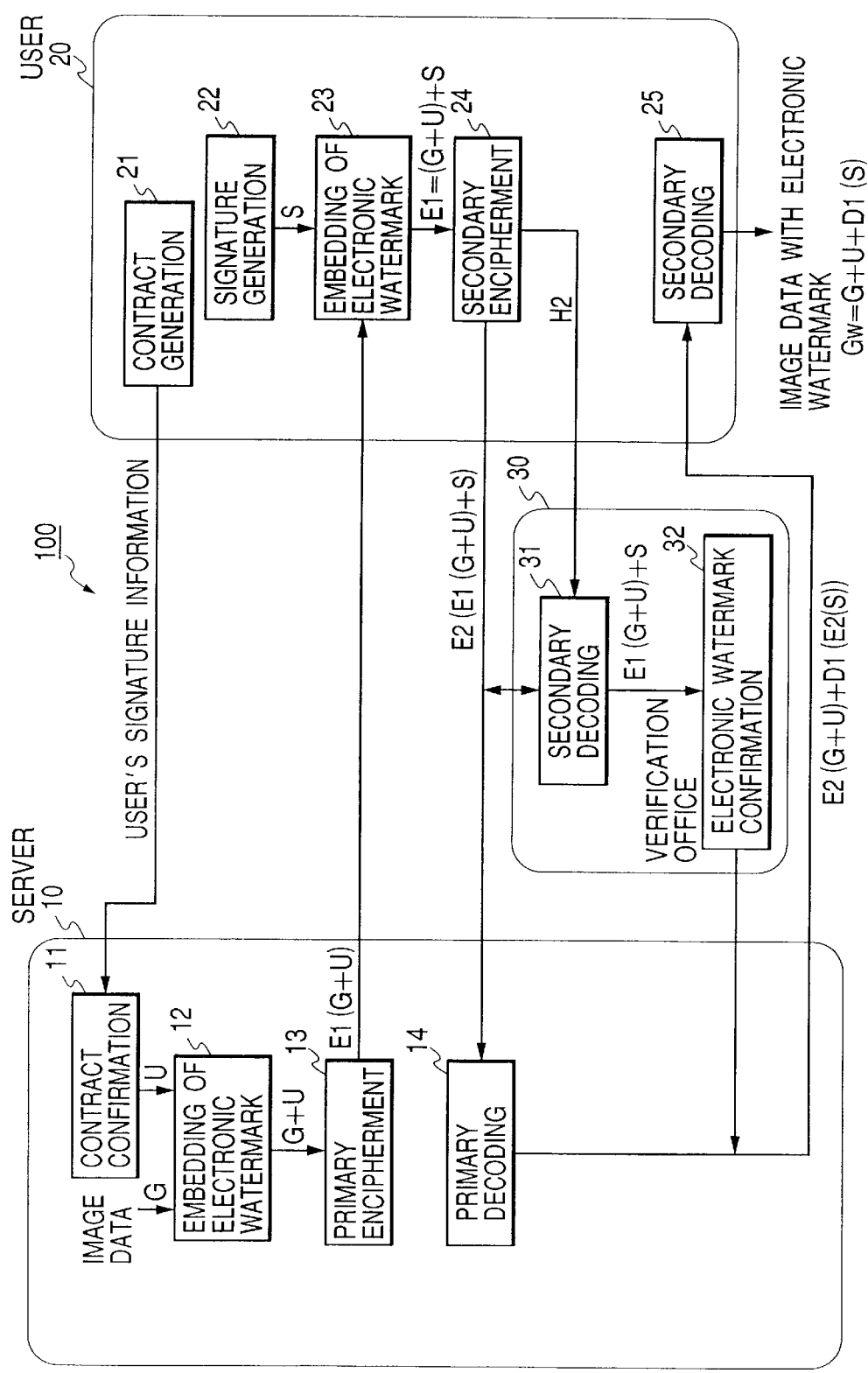
FIG. 15 is a diagram for explaining an electronic watermark system according to a fifth embodiment of the present invention.

An electronic watermark method according to the present invention is performed by a system 100 shown in FIG. 15, to which is applied an electronic information distribution system according to the present invention.

The system 100 is a network constituted by multiple entities (not shown), including a terminal 10 at the server's side (a server terminal), a terminal 20 at the user's side (a user terminal) and a terminal 30 at the verification office side (a verification office). The individual entities exchange digital data across the network.

The server terminal 10 comprises: a contract confirmation unit 11, for receiving data from the user terminal 20; an electronic watermark embedding unit 12, for receiving image data (digital data), for example; a primary encryption unit 13, for receiving the output of the electronic watermark embedding unit 12; and a primary decryption unit 14, for receiving data from the user terminal 20. The data from the primary encryption unit 13 and the primary decryption unit 14 are transmitted to the user terminal 20.

The user terminal 20 comprises: a contract generator 21, for transmitting data to the contract confirmation unit 11 of the server terminal 10; a signature generator 22; an electronic watermark embedding unit 23, for receiving data from the signature generator 22 and from the primary encryption unit 13 of the server terminal 10; a secondary encryption unit 24, for receiving data from the electronic watermark embedding unit 23; and a secondary decryption unit 25, for receiving data from the primary decryption unit 14 of the server terminal 10. The data output by the secondary decryption unit 25 are image data containing an electronic watermark. The data output by the secondary encryption unit 24 are transmitted to the primary decryption unit 14 of the server terminal 10, and to the verification office terminal 30.

The verification office terminal 30 comprises: a secondary decryption unit 31, for receiving data from the secondary encryption unit 24 of the user terminal 20; and an electronic watermark confirmation unit 32, for receiving data from the secondary decryption unit 31. The data from the electronic watermark confirmation unit 32 are transmitted to the server terminal 10 and the user terminal 20. The data from he second decryption unit 31 are also transmitted to he primary decryption unit 14 of the server terminal 10.

In the above system 100, information concerning the primary encryption process, such as the method used and a secret key, is only that which is available to the server, and information concerning the secondary encryption process is only that which is available to the user. It should be noted that a property both of the primary encryption process and the secondary encryption process is that regardless of whichever encryption process is performed first, a message can be deciphered by the decryption process.

Hereinafter, the encryption process is represented by "Ei( )", the decryption process is represented by "Di( )" and the embedding process concerning an electronic watermark is represented by "+".

The processing performed by the thus arranged system 100 will now be explained. First, the embedding process for an electronic watermark will be explained.

Embedding Process

1)First, to obtain desired image data G, the user terminal 20 issues to the server terminal 10 a request bearing the user's signature. The requested data is information (user's signature information) that is generated by the contract generator 21 and that is hereinafter called contract information.

2)The contract confirmation unit 11 in the server terminal 10 employs the user's signature to verify the received contract information, and then uses the contract information to prepare user information U. The electronic watermark embedding unit 12 embeds, in the requested image data G, the user information U prepared by the contract confirmation unit 11. The first encryption unit 13 performs the primary encryption process E1( ) for the image data (G+U) using the user information U that is embedded, and transmits the obtained data to the user terminal 20.

In this fashion, the user terminal 20 receives the primary encrypted image data E1(G+U).

3)Then, the signature generator 22 of the user terminal 20 generates signature information S using its own secret key. The electronic watermark embedding unit 23 embeds the signature information S, generated by the signature generator 22, in the primary encrypted image data E1(G+U) that are transmitted (distributed) by the server terminal 10. The secondary encryption unit 24 performs the secondary encryption of the primary encrypted image data E1(G+U)+S, in which the signature information S is embedded by the electronic watermark embedding unit 23, and transmits the obtained image data to the verification office 30. In this fashion, the verification office 30 receives the secondarily encrypted image data E2(E1(G+U)+S).

At this time, the secondary encryption unit 24 generates a hash value H2 for the secondary encrypted image data E2(E1(G+U)+S), which are to be transmitted to the verification office 30, provides a signature for the hash value H2, and transmits to the verification office 30 the obtained value together with the secondary encryption secret key and secret information concerning an electronic watermark, except for the signature information S.

The secret information is information concerning the embedding location and the depth for detecting the electronic watermark, and before transmission, it is encrypted by another encryption method used in common with the verification office 30.

The hash value is a value obtained by calculating the hash function h( ), and the hash function is a compression function that seldom causes a collision. A collision in this case would mean that for the different values x1 and x2, h(x1)=h(x2). The compression function is a function for converting a bit string having a specific bit length into a bit string having a different bit length. Therefore, the hash function is a function h( ) by which a bit string having a specific bit length is converted into a bit string having a different bit length, and for which values x1 and x2 that satisfy h(x1)=h(x2) seldom exist. Since a value x that satisfies y=h(x) is not easily obtained from an arbitrary value y, accordingly, the hash function is a one-way function. Specific examples for the hash function are an MD (Message Digest) 5 or an SHA (Secure Hash Algorithm). 4) Following this, the secondary decryption unit 31 of the verification office 30 verifies the signature affixed to the hash value H2 received from the user terminal 20, and confirms that the hash value H2 matches the hash value of the transmitted data. After these confirmations, the secondary decryption unit 31 decrypts the secondary encrypted image data E2 (E1 (G+U)+S), and extracts the signature information S from the image data. The electronic watermark confirmation unit 32 examines the signature information S. If the signature information S is correct, verification information is provided with the signature of the verification office 30. Finally, the verification office 30 transmits to the server terminal 10 the secondary encrypted image data E2 (E1 (G+U)+S) that are received from the user terminal 20, the hash value H2 and the signature therefor, and the verification information concerning these data and the signature therefor.

5) Next, the primary decryption unit 14 of the server terminal 10 confirms the verification information and the accompanying signature received from the verification office 30, and verifies the secondary encrypted image data E2 (E1 (G+U)+S), the hash value H2 and its affixed signature. After these confirmations, the primary decryption unit 14 performs the primary decryption for the secondary encrypted image data E2 (E1 (G+U)+S) to obtain the image data E2 (G+U)+D1 (E2 (S)), which are then transmitted to the user terminal 20.

6) The secondary decryption unit 25 of the user terminal 20 performs the secondary decryption for the image data E2 (G+U)+D1 (E2 (S)) received from the server terminal 10, and extracts image data Gw in which is embedded an electronic watermark. The image data in which is embedded the electronic watermark is therefore represented by Gw=G+U+D1 (S). This indicates that the user information U and the user's signature information S that is affected by the primary encryption are embedded as watermark information in the original image data G.

If at procedure 4) correct watermark information is not verified by the verification office 30 due to the performance of an illegal activity by the server or the user, notifications to that effect are forwarded to the server terminal 10 and to the user terminal 20. Even when the transaction is halted at this time, the server can prevent the user from illegally acquiring image data while it can not obtain a payment for the data, and the user does not need to pay the server the cost of the image data so long as it can not obtain the data. Therefore, the performance of an illegal activity is presents no problem for either the server or the user. When an illegal copy (an illegal image) is found, a culpable person can be easily identified by the following simple verification process.

Verification Process

1) First, the server terminal 10 extracts user information U' from an illegal image Gw'=G+U'+D1 (S') that is discovered, and further extracts signature information S' by performing the primary encryption for the illegal image Gw'.

2) When correct signature information is extracted (S'=S), the server terminal 10 submits that to the verification office 30 to ascertain whether the user has performed and illegal activity. This is possible because the correct signature information S can be created only by that user, and the server has no access to the signature information S.

3) If correct signature information can not be extracted (S'≠S), the server terminal 10 submits it to the verification office 30 to ascertain whether the server has performed an illegal activity.

According to the electronic watermark method of the fifth embodiment, since both the server terminal 10 and the user terminal 20 perform the digital data encryption process and the electronic watermark information embedding process, even if either the server or the user independently illegally copies digital data, such an activity can be easily detected and a culpable person can be easily identified. Further, since the advantages accruing to the sever and to the user conflict, collusion between the two does not occur. And even if the two were in collusion, an illegal activity could be easily detected. The security of this process is based on that the verification office being trustworthy.

A sixth embodiment of the present invention will now be described.

Recently, the transfer of money across networks, a fund transfer procedure that is called electronic cash, has come to be employed. Since as with a regular cash payment, the name of the owner of an electronic cash transfer is not identified, anonymity is attained. If the attainment of anonymity were not possible, a seller of a product could obtain from an electronic cash transfer information concerning a purchaser and the use of its product, and the privacy of a user would not be protected. Therefore, the protection of the privacy of a user is as important as is the protection of a copyright for a creator who uses an electronic watermark.

In a sixth embodiment, therefore, the anonymity of a user is provided for a purchase, and when an illegality, such as illegal distribution of images, is found, it is possible to identify an unauthorized distributor, which is the original purpose of an electronic watermark. This is achieved by, for example, a system 200 shown in FIG. 16.

The system 200 has the same structure as the system 100 according to the fifth embodiment, with an anonymous public key certificate that is issued by a verification office 30 being provided for a user terminal 20.

Generally, in order to authenticate signature information, a certificate issued by an organization called a verification office is added to a public key that is used for examining the signature information.

The verification office is an organization that issues certificates for public keys belonging to users in order to provide authentication for public keys in accordance with the public key encryption system. That is, the verification office employs a secret key it owns to provide a signature for the public key of a user or for data concerning the user, and for this purpose prepares and issues a certificate. When a user receives from another user a signature that is accompanied by a certificate, the user examines the certificate using the public key of the verification office to verify the authentication provided by the user who transmitted the public key (at least the fact that authentication has been provided the user by the verification office). Both VeriSign and CyberTrust are well known organizations that operate such verification offices.

Figure 16:
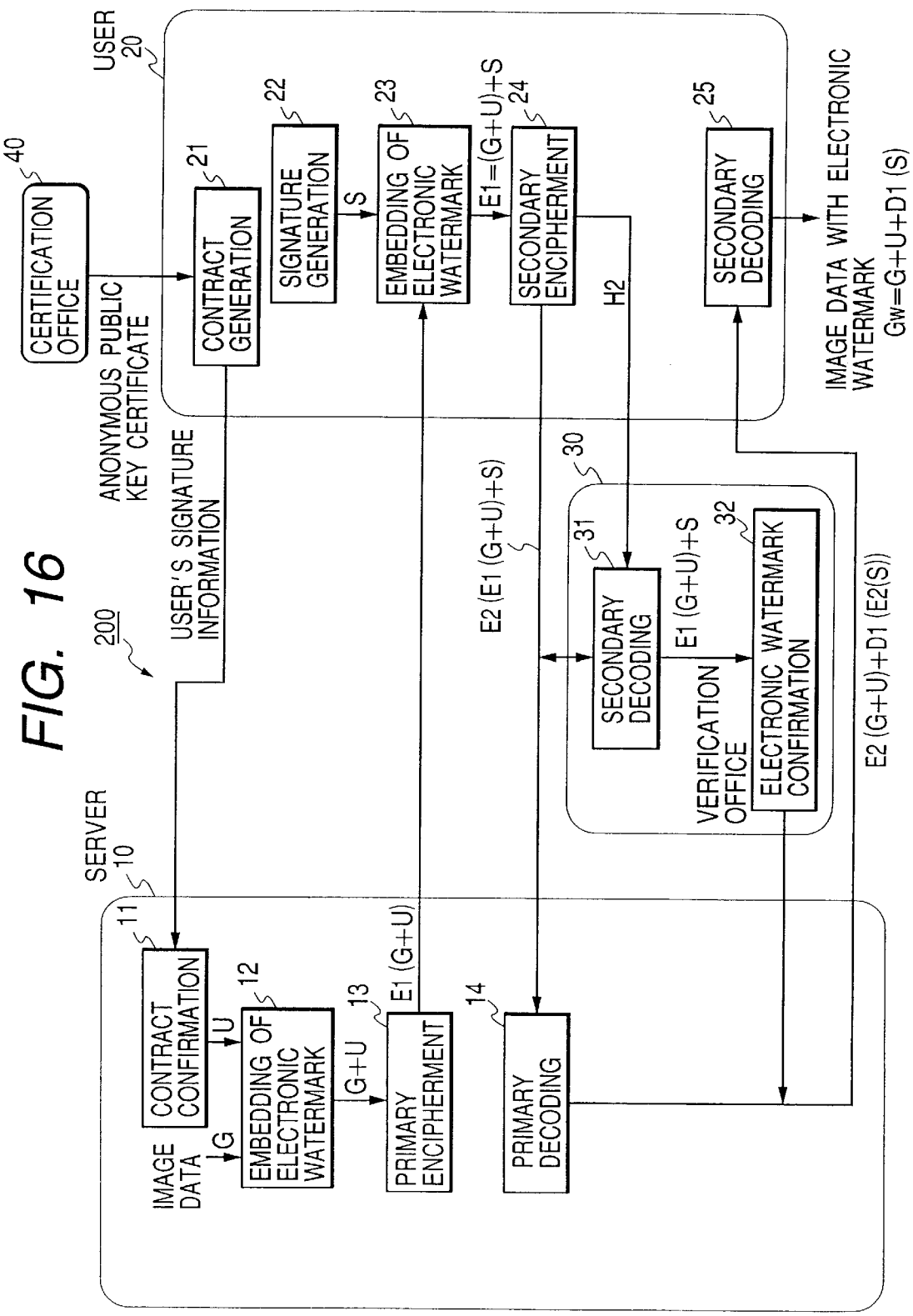
FIG. 16 is a diagram for explaining an electronic watermark system according to a sixth embodiment of the present invention.

When at procedure 2) of the embedding process in the fifth embodiment a server examines a signature to verify the contract information for a user, the server can employ the public key with a signature issued by the verification office 30 in FIG. 16. However, since the name of the owner of the public key is generally written in the certificate, user anonymity is not provided at the time data are purchased.

On the other hand, if the verification office 40 keeps secret the correspondence of public keys and their owners, the name of an owner may not be written in the certificate for a public key. An anonymous certificate for a public key is hereinafter called an "anonymous public key certificate", and a public key for which such a certificate is provided is called an "anonymous public key with a certificate". In procedure 1) of the above described embedding process, when the user terminal 20 transmits to the server terminal 10 not only contract information but also the anonymous public key with a certificate so that the contract information for the signature and the signature information S can be examined, the user can remain anonymous when purchasing digital data.

The server terminal 10 receives the anonymous public key with the certificate as information to be used for identifying a user. When an illegal copy is found, the server terminal 10 submits the anonymous public key with the certificate to the verification office 40 and in turn obtains the name of the user to whom the public key corresponds, so that the user can be identified. Consequently, the procedures 1) and 2) of the embedding process and the procedure 1) of the verification process in the fifth embodiment are modified as follows in order both to provide anonymity for a user when purchasing digital data and to identify an unauthorized user when the performance of an illegal activity is discovered.

The embedding process and the verification process performed by the system 200 in FIG. 16 will be specifically explained.

Embedding Process

1)First, in the user terminal 20, contract generator 21 provides, for contract information for requesting desired image data, a signature that corresponds to an anonymous public key with a certificate issued by a verification office 30, and together with the anonymous public key with the certificate, transmits the contract information to the server terminal 10.

2)In the server terminal 10, a contract confirmation unit 11 uses the public key of the verification office 30 to examine the public key of the user, following which it verifies the signature provided for the contract information using the anonymous public key of the user and prepares user information U by the user, at the least, of either the contract information or the anonymous public key with the certificate. An electronic watermark embedding unit 12 embeds, in requested image data G, the user information U that is prepared by the contract confirmation unit 11. A primary encryption unit 13 performs the primary encryption process E1( ) for the resultant image data G, and transmits the obtained data to the user terminal 20. In this manner, the user terminal 20 receives primary encrypted image data E1(G+U).

Since sequential procedures 3) to 6) are the same as those in the fifth embodiment, no explanation for them will be given. In procedure 3), however, the secondary encryption unit 24 of the user terminal 20 employs a different encryption method used in common with the server terminal 10 to encrypt the secret information, except for the signature information S, concerning an electronic watermark, and transmits to the verification office 30 the obtained secret information together with a secret key for the secondary encryption.

Verification Process

1)The server terminal 10 extracts user information U' from an illegal image Gw' that is discovered, and performs the primary encryption of the image Gw' to extract signature information S'. Further, the server terminal 10 submits to the verification office 30 the user information U' extracted from the illegal image Gw', and the anonymous public key obtained from the contract information, and requests the name of a user who corresponds to the anonymous public key.

The sequential procedures 2) and 3) are the same as those in the fifth embodiment. That is, when correct signature information is extracted (S'=S), the verification office 30 determines that the user has performed an illegal activity, and when correct signature information is not extracted (S'≠S), it determines that the server performed an illegal activity.

As is described above, according to the sixth embodiment, the user can remain anonymous, even so far as the verification office is concerned, when purchasing digital data.

Various data, to include image data in the fifth and the sixth embodiments and a hash value obtained during the embedding process for an electronic watermark, can be stored in one of the image formats shown in FIGS. 6 and 7. According to the following general image format, for example, image data that are transmitted at individual steps can be stored in an image data portion, and a corresponding hash value and its signature can be stored in an image header portion. Furthermore, a hash value and its signature, which the user must retain, and the secondary encryption key can be stored in the image header portion, while image data having an electronic watermark can be stored in the image data portion.

As is apparent from the above explanation, according to the electronic watermark method and the electronic information distribution system in the fifth and the sixth embodiments, a means or an entity for verifying the correctness of at least one of an encryption process and the electronic watermark embedding process is provided separately from the means or the entities for performing an encryption process and the electronic watermark embedding process. The illegal copying and distribution of digital data and a culpable person can be identified, so that all illegal activities can be prevented. As a result, as regards the illegal distribution of digital data, a safe system can be provided. Furthermore, an image file apparatus can be provided that can file an image data in which an electronic watermark is embedded by the electronic watermark method, and that can, in particular, more easily identify the embedded electronic watermark information. In addition, this system can be easily applied for a key management office that maintains the anonymity of a user and that prevents unauthorized use of cryptography.

A seventh and an eighth embodiments will now be described while referring to the accompanying drawings.

First, a seventh embodiment will be explained.

Figure 17:
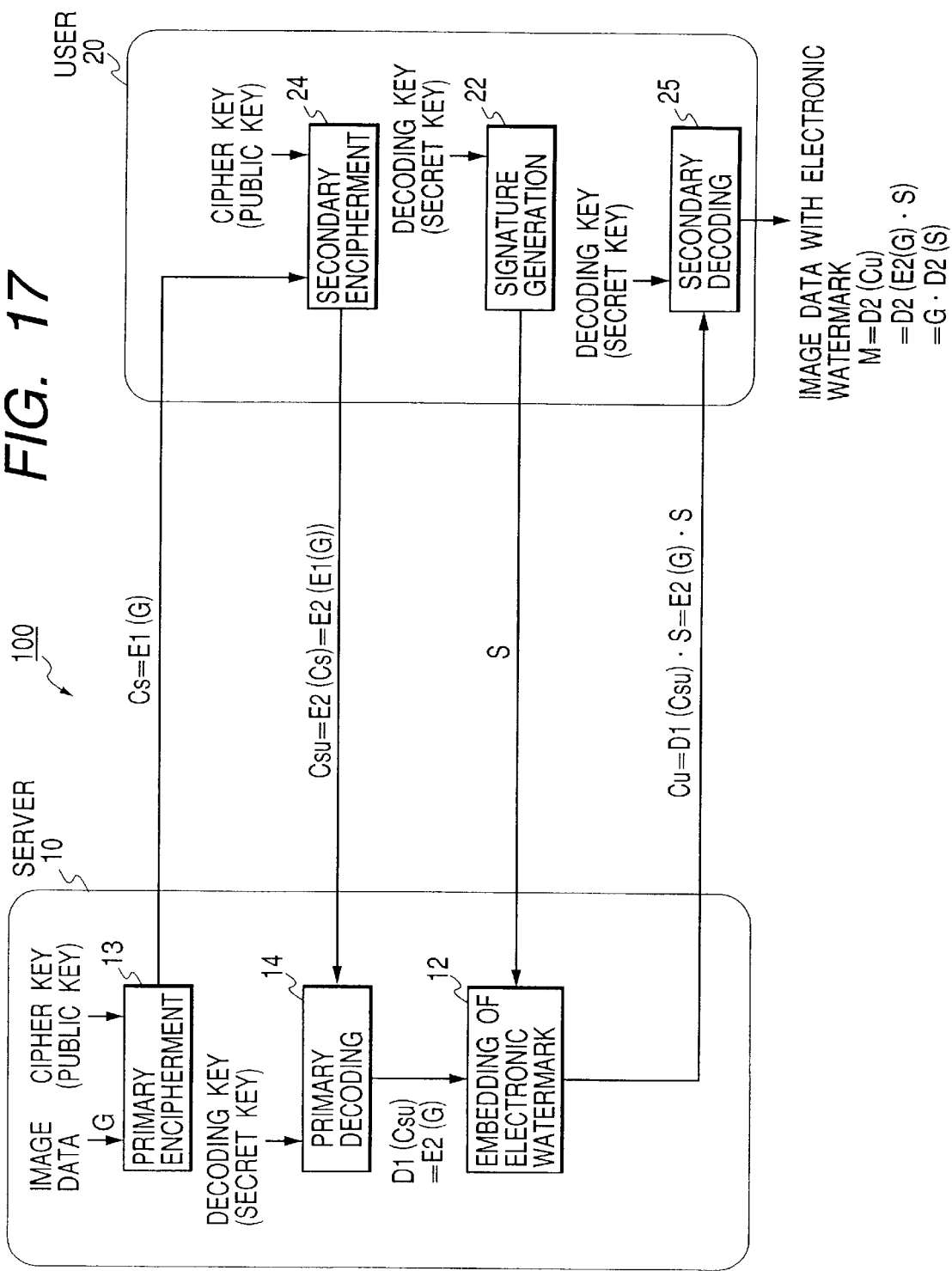
FIG. 17 is a block diagram illustrating the arrangement of an electronic information distribution system according to a seventh embodiment of the present invention.

An electronic watermark method according to the present invention is performed by a system 100 shown in FIG. 17, to which an electronic information distribution system according to the present invention is applied.

The system 100 is a network constituted by multiple entities (not shown), including a terminal 10 at the server's side (a server terminal) and a terminal 20 at the user's side (a user terminal). The individual entities exchange digital data across the network.

An electronic watermark method or a public key encryption method, for example, is applied for the system 100.

The server terminal 10 comprises: a primary encryption unit 13, for receiving image data (digital data) G and an encryption key (public key) input by a server, for example; a primary decryption unit 14, for receiving data from the user terminal 20 and a decryption key (secret key) input by the server; and an electronic watermark embedding unit 12, for receiving the output of the primary decryption unit 14. The outputs of the electronic watermark embedding unit 12 and the primary encryption unit 13 are transmitted to the user terminal 20.

The user terminal 20 comprises: a secondary encryption unit 24, for receiving data from the primary encryption unit 13 of the server terminal 10 and an encryption key (public key) that is input by a user; a signature generator 22, for receiving a decryption key (secret key) input by the user; and a secondary decryption unit 25, for receiving data from the electronic watermark embedding unit 12 of the server terminal 10 and the decryption key (secret key) input by the user. The data from the secondary encryption unit 24 are transmitted to the primary decryption unit 14 of the server terminal 10, the data from the signature generator 22 are transmitted to the electronic watermark embedding unit 12 of the server terminal 10, and the data from the secondary decryption unit 25 are output as image data with an electronic watermark.

With the above arrangement, the system 100 provides the following features:

1) The contents of the data G are kept secret from third parties, persons other than the server and the user.

2) In the protocol, the server terminal 10 performs, for example, an electronic watermark embedding process and does not transmit the data G to the user terminal 20 until the data has been processed.

3) The protocol that inhibits the imputation of a crime to another person is employed to prevent the illegal distribution of data by the server and the user.

Hereinafter, the encryption process is represented by "Ei( )", the decryption process is represented by "Di( )", and the embedding process concerning an electronic watermark is represented by multiplication. The protocol for the system 100 will now be described.

1) First, the primary encryption unit 13 of the server terminal 10 encrypts image data G by using the encryption key (public key) input by the server.

The obtained message Cs is represented by $$Cs=E1(G).$$

The encrypted message Cs is transmitted to the secondary encryption unit 24 of the user terminal 20.

2) The second encryption unit 24 of the user terminal 20 encrypts the message Cs received from the server terminal 10 by using the encryption key (public key) input by the user.

The obtained message Csu is represented as $$Csu=E2(Cs)=E2(E1(G)).$$

The signature generator 22 generates signature information S using the decryption key (secret key) input by the user.

The encrypted message Csu obtained by the secondary encryption unit 24 is transmitted to the primary decryption unit 14 of the server terminal 10, and the signature information S generated by the signature generator 22 is transmitted to the electronic watermark embedding unit 12 of the server terminal 10.

3) Upon receiving the encrypted message Csu from the secondary encryption unit 24 of the user terminal 20, the primary decryption unit 14 of the server terminal 10 decrypts the message Csu by using the decryption key (secret key) input by the server.

The obtained message D1 is represented by $$D1(Csu)=D1(E2(E1(G)))=E2(G).$$

The electronic watermark embedding unit 12 embeds the signature information S received from the user terminal 20 in the decrypted message D1 (Csu) obtained by the primary decryption unit 14, and transmits the resultant message to the secondary decryption unit 25 of the user terminal 20.

Therefore, the data Cu to be transmitted to the secondary decryption unit 25 of the user terminal 20 is represented by $$Cu=D1(Csu)\cdot S=E2(G)\cdot S.$$

4) The secondary decryption unit 25 of the user terminal 20 employs the decryption key (secret key) input by the user to decrypt the data Cu that are received from the electronic watermark embedding unit 12 of the server terminal 10, and extracts image data M which have an electronic watermark.

Therefore, the image data M which has an electronic watermark is represented by $$M=D2(Cu)=D2(E2(G)\cdot S)=G\cdot D2(S).$$

This means that the watermark information (signature information) S that is affected by the secondary encryption is embedded in the original image data G.

When RSA cryptography is employed to implement the protocols 1) to 4), the processing is performed as follows.

Figure 18:
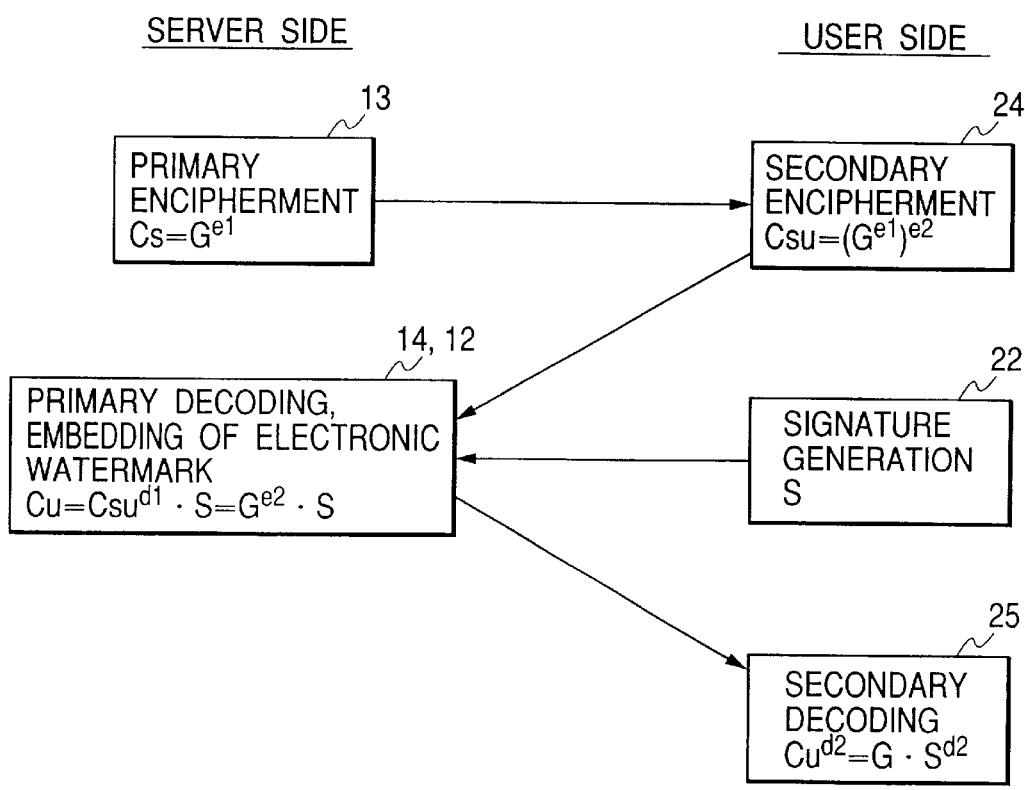
FIG. 18 is a diagram for explaining the implementation of the protocol for the above system when RSA cryptography is used.

For the following explanation that is given while referring to FIG. 18, assume that the public keys of the server and the user are e1 and e2 and the secret keys are d1 and d2.

1) First, the server terminal 10 transmits to the user terminal 20 a message Cs obtained by encrypting image data G using the public key e1 of the server.

The encrypted message Cs (first data) is represented by $$Cs = G^{e1}.$$

2) Then, the user terminal 20 transmits to the server terminal 10 a message Csu obtained by encrypting the message Cs using the public key e2 of the user.

The encrypted message Csu is represented by $$Csu = (G^{e1})^{e2}.$$

The signature information S (second data) is also transmitted.

3) The server terminal 10 transmits to the user terminal 20 data Cu obtained by embedding the signature information S in message $Csu^{d1}$, which is acquired by decrypting the encrypted message Csu using the secret key d1 of the server.

The data Cu (third data) is represented by $$Cu = Csu^{d1} \cdot S = G^{e2} \cdot S.$$

4) Then, the user terminal 20 finally provides for user data (image data M with an electronic watermark) that is obtained by decrypting the data Cu using the secret key d2 of the user. The data is represented by $$Cu^{d2} = (G^{e2} \cdot S)^{d2} = G \cdot S^{d2}.$$

As is described above, since in the seventh embodiment the image data G are always encrypted before transmission, the above described feature 1) can be provided.

In addition, since in procedure 3) the server 10 performs the electronic watermark embedding process for the signature information S, feature 2) can be implemented.

Since the data that the user finally obtains includes the signature information S that is signed using the secret key d2 that is known only by the user, the server can not counterfeit it and illegally distribute the final data.

Whether the electronic watermark embedding process has been correctly performed by the server can be ascertained by determining at the user's side whether the following equation has been established $$Csu = (Cu/S)^{e1}.$$

Whether data are illegally distributed can be determined by examining the extracted embedded information (signature information) $S^{d2}$ using the public key e2 of the user.

An eighth embodiment of the present invention will now be described.

When, for example, there are multiple users for one server, the server adds non-encrypted information for identifying a user to image data for which an electronic watermark is provided.

Figure 19:
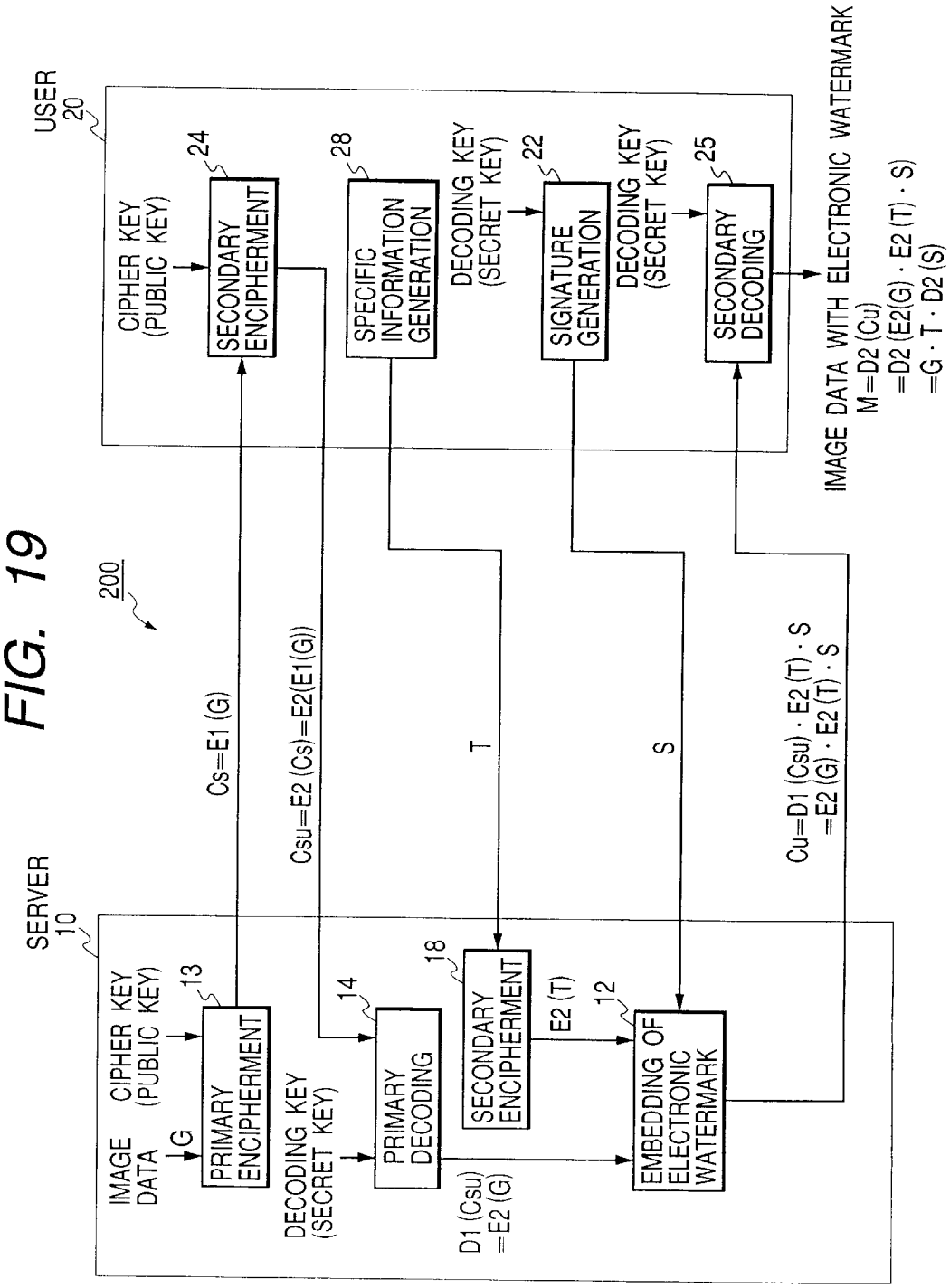
FIG. 19 is a block diagram illustrating an electronic information distribution system according to an eighth embodiment of the present invention.

An example arrangement of such a system is shown in FIG. 19.

A system 200 is the same as the system 100 in the seventh embodiment, except that an additional secondary encryption unit 18 is provided for the server terminal 10, and a specific information generator 28 is additionally provided for the user terminal 20.

In the server terminal 10, the secondary encryption unit 18 receives data from the specific information generator 28 of the user terminal 20 and the encryption key (public key) from the user. The data from the secondary encryption unit 18 are supplied to an electronic watermark embedding unit 12.

With this arrangement, the system 200 can implement the above described features 1), 2) and 3), even when it must cope with multiple users.

The protocol for the system 200 will now be explained.

The same reference numerals as are used for the system 100 in FIG. 17 are also used to denote the corresponding or identical components in the system 200 in FIG. 19, and no detailed explanation for them will be given.

1) First, the primary encryption unit 13 of the server terminal 10 encrypts the image data G using the encryption key (public key) input by the server, and transmits the encrypted message Cs (=E1 (G)) to the secondary encryption unit 24 of the user terminal 20.

2) The secondary encryption unit 24 of the user terminal 20 employs the encryption key (public key) input by the user to encrypt the message Cs received from the primary encryption unit 13 of the server terminal 10, and transmits the obtained message Csu (=E2 (Cs)=E2 (E1 (G)) to the primary decryption unit 14 of the server terminal 10.

The signature generator 22 generates signature information S using the decryption key (secret key) input by the user, and transmits it to the electronic watermark embedding unit 12 of the server terminal 10.

Furthermore, the specific information generator 28 generates information T that includes the public key that corresponds to the secret key of the user, i.e., information (specific information) T for specifying a user, and transmits the information T to the secondary encryption unit 18 of the server terminal 10.

3) The primary decryption unit 14 of the server terminal 10 employs the decryption key (secret key) input by the server to decrypt the message Csu that is received from the secondary encryption unit 24 of the user terminal 20, and transmits the decrypted message D1(Csu)=D1(E2(E1(G)))= E2(G) to the electronic watermark embedding unit 12.

In addition, the secondary encryption unit 18 encrypts the specific information T, which is received from the specific information generator 28 of the user terminal 20, by using the user's encryption key (public key) that is included in the specific information T, and transmits the obtained message E2(T) to the electronic watermark embedding unit 12.

The electronic watermark embedding unit 12 embeds, in the decrypted message D1(Csu) obtained by the primary decryption unit 14, the encrypted message E2(T) obtained by the secondary encryption unit 18 and the signature information S received from the signature generator 22 of the user terminal 20, and transmits the resultant message to the secondary decryption unit 25 of the user terminal 20.

Therefore, the data Cu transmitted to the secondary encryption unit 25 of the user terminal 20 is represented by $$Cu = D1(Csu) \cdot E2(T) \cdot S = E2(G) \cdot E2(T) \cdot S.$$

4) The secondary encryption unit 25 of the user server 20 decrypts the data Cu received from the server terminal 10 using the decryption key (secret key) input by the user, and extracts image data M for which an electronic watermark is provided.

The image data M for which an electronic watermark is provided is represented by $$M = D2(Cu) = D2(E2(G) \cdot E2(T) \cdot S) = G \cdot T \cdot D2(S).$$

This means that the watermark information (signature information) S that is affected by the secondary decryption is embedded in the original image data G and the non-encrypted specific information T.

When the RSA cryptography is employed to implement the protocols 1) to 4), the processing is preformed as follows.

Figure 20:
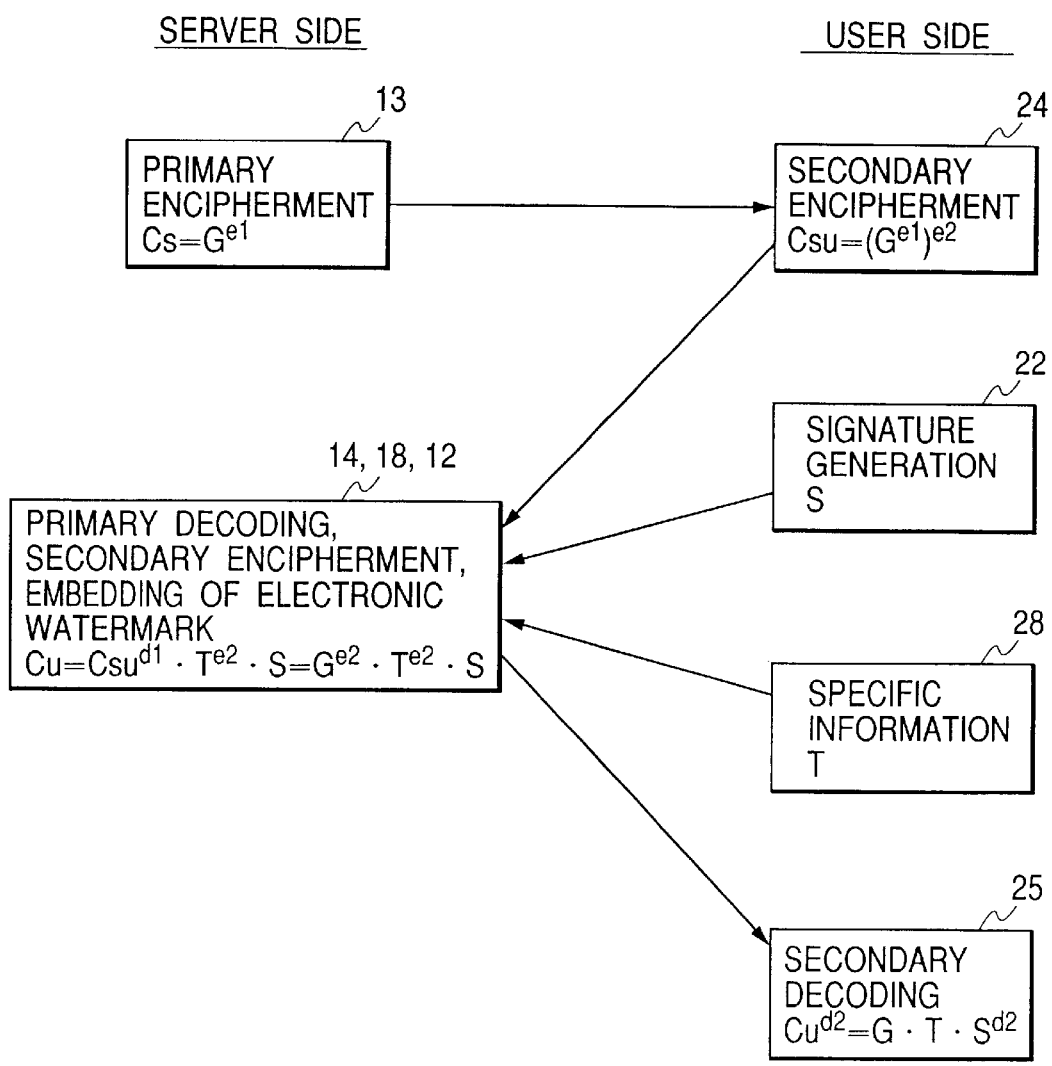
FIG. 20 is a diagram for explaining the implementation of the protocol for the above system when RSA cryptography is used.

For the following explanation that is given while referring to FIG. 20, assume that the public keys of the server and the user are e1 and e2 and the secret keys are d1 and d2.

1) First, the server terminal 10 transmits to the user terminal 20 message Cs (=$G^{e1}$: first data) that is obtained by encrypting image data G using the public key e1 of the server.

2) Then, the user terminal 20 transmits to the server terminal 10 message Csu (=$(G^{e1})^{e2}$) that is obtained by encrypting the message Cs using the public key e2 of the user.

The signature information S and specific information T (second data) are also transmitted.

3) The server terminal 10 transmits to the user terminal 20 data Cu (=$Csu^{d1} \cdot T^{e2} \cdot S = G^{e2} \cdot T^{e2} \cdot S$: third data), which is obtained by decrypting the encrypted message Csu using the secret key d1 of the server, by encrypting the signature information S and the specific information T using the public key e2 of the user, and by embedding the obtained encrypted message $T^{e2}$ in the obtained decrypted message $Csu^{d1}$.

4) Then, the user terminal 20 finally provides for a user data (image data M with an electronic watermark) that is obtained by decrypting the data Cu using the secret key d2 of the user. The data is represented by $$Cu^{d2} = (G^{e2} \cdot S)^{d2} = G \cdot S^{d2}.$$

As is described above, in the eighth embodiment as in the seventh embodiment, the features 1), 2) and 3) can be implemented.

In this embodiment, the data M that the user finally obtains includes non-encrypted information T for specifying a user. Therefore, when the data M is illegally distributed to a user, that user who received the data M can be identified by using the specific information T included in the data M, and the encrypted signature information $S^{d2}$ can be examined using the public key of the thus identified user. As a result, the illegal distribution od data can be prevented, regardless of whether there are multiple users.

In addition, since the server can have no knowledge of the original image data for the signature information S and the specific information T that are embedded and are to be decrypted, it is also possible to provide the feature "since the user can decrypt encrypted image data G without the notifying the server, the privacy of the user can be protected".

In the eighth embodiment, the user transmits the signature information S and the specific information T to the server separately. However, the information T for identifying a user may be included in the signature information S. Thus, since the specific information T need not be transmitted separately, the structure can be simplified.

The public key used for examining the image data and the signature in the seventh and the eighth embodiments can be stored in one of the formats in FIGS. 6 to 12.

As is described above, according to this embodiment, since the first data (original data) are always the encrypted data, the contents of the first data can be kept secret from third parties, persons other than the server and the user.

Furthermore, since the processing (electronic watermark embedding process for the signature information, etc.) is performed by the server side (first entity), transmission to the user (second entity) of the first data (original data) in the unprocessed state can be prevented.

The final data obtained by the user (second entity) includes the second data (signature information, etc.) signed using the secret key that only the user knows, the server (first entity) can neither forge it nor illegally distribute the final data. Furthermore, the illegal distribution of data can be detected by examining the second data (signature information, etc.) using the public key of the user (second entity). As a result, the illegal distribution of data by the server (first entity) and by the user (second entity) can be prevented.

Therefore, the illegal distribution of data can be fully prevented, and data can be safely maintained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electronic watermark method used for a network system that includes a plurality of entities, wherein for the exchange of digital information by at least a first entity and a second entity of the plurality of entities, the first entity embeds an electronic watermark in the digital information, performs a first encryption process for the digital information, and transmits the resultant digital information to the second entity, the second entity embeds a second electronic watermark in the digital information received from the first entity, performs a second encryption process for the digital information, obtains a value by transforming the resultant digital information using a one-way compression function, and transmits the value and the resultant digital information to the first entity, and the first entity converts the digital information received from the second entity using the one-way compression function and, in accordance with whether the thus obtained value matches the value received from the second entity, performs a first decoding process related to the first encryption process for the digital information.

2. An electronic watermark method according to claim 1 wherein said electronic watermark embedding process performed by the first entity is a process for embedding information concerning the second entity.

3. An electronic watermark method according to claim 1 wherein said electronic watermark embedding process performed by the first entity is a process for embedding information concerning digital information to be transmitted.

4. An electronic watermark method according to claim 1 wherein said electronic watermark embedding process performed by the second entity is a process for embedding information that only the second entity is capable of creating.

5. A method according to claim 1, wherein the first entity transmits to the second entity the digital information on which said first decoding process has been performed, and the second entity performs a second decoding process for the digital information received from the first entity on which said first decoding process has been performed.

6. A method according to claim 1 wherein the one-way compression function is a hash function.

7. An electronic watermark system for a network system that includes a plurality of entities, wherein for the exchange of digital information by at least a first entity and a second entity of the plurality of entities, the first entity embeds an electronic watermark in the digital information, performs a first encryption process for the digital information, and transmits the resultant digital information to the second entity, the second entity embeds a second electronic watermark in the digital information received from the first entity, performs a second encryption process for the digital information, obtains a value by transforming the resultant digital information using a one-way compression function, and transmits the value and the resultant digital information to the first entity, and the first entity converts the digital information received from the second entity using the one-way compression function and, in accordance with whether the thus obtained value matches the value received from the second entity, performs a first decoding process related to the first encryption process for the digital information.

8. A computer-readable medium containing program codes for an electronic watermark method for a network system that includes a plurality of entities, wherein for the exchange of digital information by at least a first entity and a second entity of the plurality of entities, the first entity embeds an electronic watermark in the digital information, performs a first encryption process for the digital information, and transmits the resultant digital information to the second entity, the second entity embeds a second electronic watermark in the digital information received from the first entity, performs a second encryption process for the digital information, obtains a value by transforming the resultant digital information using a one-way compression function, and transmits the value and the resultant digital information to the first entity, and the first entity converts the digital information received from the second entity using the one-way compression function and, in accordance with whether the thus obtained value matches the value received from the second entity, performs a first decoding process related to the first encryption process for the digital information.

9. A computer-readable program comprising program codes for an electronic watermark method for a network system that includes a plurality of entities, wherein for the exchange of digital information by at least a first entity and a second entity of the plurality of entities, the first entity embeds an electronic watermark in the digital information, performs a first encryption process for the digital information, and transmits the resultant digital information to the second entity, the second entity embeds a second electronic watermark in the digital information received from the first entity, performs a second encryption process for the digital information, obtains a value by transforming the resultant digital information using a one-way compression function, and transmits the value and the resultant digital information to the first entity, and the first entity converts the digital information received from the second entity using the one-way compression function and, in accordance with whether the thus obtained value matches the value received from the second entity, performs a first decoding process related to the first encryption process for the digital information.

* * * * *

UNITED STATES PATENT AND TRADEMARK OFFICE
CERTIFICATE OF CORRECTION

PATENT NO. : 6,425,081 B1
DATED : July 23, 2002
INVENTOR(S) : Keiichi Iwamura

It is certified that error appears in the above-identified patent and that said Letters Patent is hereby corrected as shown below:

Title page, Item [54] and Column 1, line 1,
Title, "WATERMARK SYSTEM" should read -- WATERMARK SYSTEM, --.
Item [56], OTHER PUBLICATIONS, "Theory and and Application" should read -- Theory and Application --.
Item [57], ABSTRACT, "weparately " should read -- separately --.

Drawings,
Fig. 12, "HIGHT" (both occurrences) should read -- HEIGHT --.

Column 2,
Line 33, "easily•using" should read -- easily using --; and
Line 38, "can not" should read -- cannot --.

Column 3,
Line 8, "above described" should read -- above-described --.

Column 4,
Line 43, "are" should read -- ¶ are --; and
Line 50, "above described" should read -- above-described --.

Column 5,
Lines 16 and 21, "can not" should read -- cannot --.

Column 6,
Line 2, "(can not" should read -- (cannot --.
Line 3, "can not" should read -- cannot --;
Line 4, "is embedded the user information d7." should read -- the user information d7 is embedded. --; and
Line 38, "above described" should read -- above-described --.

Column 8,
Lines 17 and 35, "above described" should read -- above-described --;
Line 28, "can not" should read -- cannot --; and
Lines 44, 56 and 61, "an" should be deleted.

Column 9,
Lines 3, 10, 20, 47 and 56, "an" should be deleted; and
Line 30, "transits" should read -- transmits --.

UNITED STATES PATENT AND TRADEMARK OFFICE
CERTIFICATE OF CORRECTION

PATENT NO. : 6,425,081 B1
DATED : July 23, 2002
INVENTOR(S) : Keiichi Iwamura

It is certified that error appears in the above-identified patent and that said Letters Patent is hereby corrected as shown below:

Column 10,
Lines 11, 22, 26 and 37, "an" should be deleted.

Column 11,
Lines 7, 16, 23, 34 and 51, "an" should be deleted;
Line 30, "the" (first occurrence) should be deleted; and
Lines 46 and 55, "the" should be deleted.

Column 12,
Lines 20 and 36, "an" should be deleted; and
Line 42, "the" should be deleted.

Column 13,
Lines 5, 21, 31 and 45, "an" should be deleted;
Line 27, "the" (first occurrence) should be deleted; and
Lines 34 and 37, "the" (second occurrence) should be deleted.

Column 14,
Lines 10, 19, 34 and 46, "an" should be deleted.

Column 15,
Lines 1 and 13, "an" should be deleted.

Column 18,
Line 20, "thea" should read -- the --;
Lines 34 and 65, "can not" should read -- cannot --;
Line 41, "can not" should read -- can not --; and
Line 64, "performed" should read -- performed by --.

Column 19,
Line 3, "Hi" should read -- H1 --.
Lines 10, 30 and 38, "can not" should read -- cannot --; and
Line 18, "ascertains" should read -- and ascertains --.

Column 20,
Line 16, "provided" should read -- provided to --;
Line 32, "above described" should read -- above-described --;
Line 54, "as are" should be deleted;
Line 61, "¶ 2)of" should read -- 2) of --;

UNITED STATES PATENT AND TRADEMARK OFFICE
CERTIFICATE OF CORRECTION

PATENT NO. : 6,425,081 B1
DATED : July 23, 2002
INVENTOR(S) : Keiichi Iwamura

It is certified that error appears in the above-identified patent and that said Letters Patent is hereby corrected as shown below:

Column 21,
Line 11, "the" (second occurrence) should be deleted; and
Line 41, "embodiment" should read -- embodiments --.

Column 22,
Line 32, "Explanation" should read -- ¶ Explanation --.

Column 24,
Line 47, "begun." should read -- started --.

Column 25,
Line 53, "example,;" should read -- example; --.

Column 28,
Line 11, "information SI." should read -- information S'. --;
Line 18, (close up right margin);
Line 19, (close up left margin);
Lines 25, 35 and 58, "can not" should read -- cannot --; and
Line 60, "8) When" should read -- ¶ 8) When --.

Column 29,
Lines 3 and 10, "can not" should read -- cannot --; and
Line 66, "above described" should read -- above-described --.

Column 30,
Line 20, "as are" should be deleted; and
Line 45, "the" (first occurrence) should be deleted.

Column 31,
Lines 15, 18, 21 and 39, "can not" should read -- cannot --;
Line 24, "embodiment" should read -- embodiments --; and
Line 46, "above described" should read -- above-described --.

Column 32,
Line 25, "he" should read -- the --;
Line 61, (close up right margin); and
Line 62, (close up left margin).

UNITED STATES PATENT AND TRADEMARK OFFICE
CERTIFICATE OF CORRECTION

PATENT NO.    : 6,425,081 B1
DATED         : July 23, 2002
INVENTOR(S)   : Keiichi Iwamura It is certified that error appears in the above-identified patent and that said Letters Patent is hereby corrected as shown below:

Column 33,
Line 38, "4) Following" should read -- ¶ 4) Following --.

Column 34,
Lines 15, 17 and 35, "can not" should read -- cannot --;
Line 18, "is" should be deleted;
Line 31, "and" should read -- an --;
Line 46, "sever" should read -- server --; and
Line 49, "that" should be deleted.

Column 35,
Line 24, "provided" should read -- provided to --; and
Line 41, "above described" should read -- above-described --.

Column 36,
Line 11, "the" (second occurrence) should be deleted.

Column 39,
Line 30, "above described" should read -- above-described --; and
Line 36, "can not" should read -- cannot --.

Column 41,
Line 37, "od" should read -- of --; and
Line 43, "the" should be deleted.

Column 42,
Lines 35, 39, 44 and 55, "claim 1" should read -- claim 1, --.

Signed and Sealed this

Eleventh Day of March, 2003

JAMES E. ROGAN
*Director of the United States Patent and Trademark Office*